United States Patent
Dani

(10) Patent No.: US 10,973,385 B2
(45) Date of Patent: *Apr. 13, 2021

(54) CLEANING WIPES HAVING PARTICULAR PORE VOLUME DISTRIBUTION CHARACTERISTICS

(71) Applicant: The Clorox Company, Oakland, CA (US)

(72) Inventor: Nikhil P. Dani, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,095

(22) Filed: Jul. 16, 2018

(65) Prior Publication Data

US 2019/0082926 A1    Mar. 21, 2019

Related U.S. Application Data

(63) Continuation-in-part of application No. 15/961,663, filed on Apr. 24, 2018.

(60) Provisional application No. 62/560,027, filed on Sep. 18, 2017.

(51) Int. Cl.
| | |
|---|---|
| C11D 17/04 | (2006.01) |
| C11D 3/30 | (2006.01) |
| C11D 3/20 | (2006.01) |
| C11D 3/48 | (2006.01) |
| A47L 13/17 | (2006.01) |
| B32B 3/30 | (2006.01) |
| C11D 7/26 | (2006.01) |

(52) U.S. Cl.
CPC ............... *A47L 13/17* (2013.01); *B32B 3/30* (2013.01); *C11D 3/2068* (2013.01); *C11D 3/30* (2013.01); *C11D 3/48* (2013.01); *C11D 7/263* (2013.01); *C11D 17/049* (2013.01); *B32B 2262/0253* (2013.01); *B32B 2305/026* (2013.01); *B32B 2307/72* (2013.01); *B32B 2432/00* (2013.01)

(58) Field of Classification Search
CPC ... A47L 13/17; A47K 10/421; A47K 10/3818; A47K 2010/3266; C11D 17/041; C11D 17/049; C11D 3/48; C11D 3/30; C11D 3/2068; C11D 7/263; B32B 3/30; B32B 2262/0253; B32B 2305/026; B32B 2307/72; B32B 2432/00
See application file for complete search history.

(56) References Cited

U.S. PATENT DOCUMENTS

| | | |
|---|---|---|
| 2,684,924 A | 7/1954 | Leslie et al. |
| 2,990,425 A | 6/1961 | Norman |
| 3,468,898 A | 9/1969 | Cutler et al. |
| 4,022,834 A | 5/1977 | Gundersen |
| 4,053,636 A | 10/1977 | Eustis et al. |
| 4,198,392 A | 4/1980 | Juneja |
| 4,463,045 A | 7/1984 | Ahr et al. |
| 4,540,505 A | 9/1985 | Frazier |
| 5,145,604 A | 9/1992 | Neumiller |
| 5,292,581 A | 3/1994 | Viazmensky et al. |
| 5,342,534 A | 8/1994 | Skrobala et al. |
| 5,444,094 A | 8/1995 | Malik et al. |
| 5,454,984 A | 10/1995 | Graubart et al. |
| 5,522,942 A | 6/1996 | Graubart et al. |
| 5,686,015 A | 11/1997 | Willey et al. |
| 5,798,329 A | 8/1998 | Taylor et al. |
| 5,814,591 A | 9/1998 | Mills et al. |
| 5,908,854 A | 6/1999 | McCue et al. |
| 5,922,665 A | 7/1999 | Liu |
| 5,948,743 A | 9/1999 | Fonsny et al. |
| 6,017,869 A | 1/2000 | Lu et al. |
| 6,080,706 A | 6/2000 | Blanvalet et al. |
| 6,090,768 A | 7/2000 | Delaney et al. |
| 6,110,295 A | 8/2000 | Lu et al. |
| 6,121,224 A | 9/2000 | Fonsny et al. |
| 6,130,197 A | 10/2000 | Bedrod et al. |
| 6,143,244 A | 11/2000 | Xia et al. |
| 6,143,281 A | 11/2000 | Alexander et al. |
| 6,153,568 A | 11/2000 | McCanna et al. |
| 6,187,737 B1 | 2/2001 | Geke et al. |
| 6,277,805 B1 | 8/2001 | Kupneski |
| 6,323,171 B1 | 11/2001 | Fonsny et al. |
| 6,339,057 B1 | 1/2002 | Knox et al. |
| 6,342,474 B1 | 1/2002 | Kerobo et al. |
| 6,358,900 B1 | 3/2002 | Wigley et al. |
| 6,376,455 B1 | 4/2002 | Friedli et al. |
| 6,387,855 B1 | 5/2002 | de la Mettrie |

(Continued)

FOREIGN PATENT DOCUMENTS

| | | |
|---|---|---|
| CA | 2132274 | 9/1994 |
| DE | 2212259 | 10/1972 |

(Continued)

OTHER PUBLICATIONS

International Search Report, dated Jul. 29, 2013, from counterpart PCT/US13/48586; dated Jun. 28, 2013.

*Primary Examiner* — Amina S Khan
(74) *Attorney, Agent, or Firm* — Erin Collins

(57) ABSTRACT

Pre-moistened wipes that include one or more characteristics correlated to desired properties, such as high durability, mileage, cleaning composition retention, efficacy, or the like are described. Pulp substrates typically include an anionic charge, which can result in binding or retention of a cationic biocide such as a quaternary ammonium compound while the remainder of the composition is released from the wipe (e.g., through squeezing, wiping or other compression). The present wipes are specifically tailored to include a pore size distribution characterized by pores having a size from 300 µm to 400 µm, which is larger than the pore distribution characteristics of existing wipes. Such characteristics increase release of a quaternary ammonium compound to a target surface, providing improved microefficacy, without the need for any cationic biocide release agents such as latex or a cationic salt.

13 Claims, 8 Drawing Sheets

(56) References Cited

U.S. PATENT DOCUMENTS

| | | |
|---|---|---|
| 6,387,866 B1 | 5/2002 | Mondin et al. |
| 6,387,871 B2 | 5/2002 | Faber |
| 6,429,183 B1 | 8/2002 | Leonard et al. |
| 6,462,014 B1 | 10/2002 | Johnson et al. |
| 6,583,104 B1 | 6/2003 | Christensen et al. |
| 6,596,681 B1 | 7/2003 | Mahieu et al. |
| 6,680,264 B2 | 1/2004 | Julemont |
| 6,693,070 B1 | 2/2004 | Cheung et al. |
| 6,737,068 B2 | 5/2004 | Durden |
| 6,814,088 B2 | 11/2004 | Barnabas et al. |
| 6,831,050 B2 | 12/2004 | Murch et al. |
| 6,844,308 B1 | 1/2005 | Dastbaz et al. |
| 6,849,589 B2 | 2/2005 | Liu |
| 6,936,580 B2 | 8/2005 | Sherry et al. |
| 7,071,155 B2 | 7/2006 | Griese et al. |
| 7,214,651 B2 | 5/2007 | Mohr et al. |
| 7,348,303 B2 | 3/2008 | Gallotti et al. |
| 7,396,808 B1 | 7/2008 | Hood et al. |
| 7,511,006 B2 | 3/2009 | Shimmin et al. |
| 7,530,361 B2 | 5/2009 | Killeen et al. |
| 7,550,416 B2 | 6/2009 | Woo et al. |
| 8,173,146 B2 | 5/2012 | Leroy |
| 8,252,819 B2 | 8/2012 | Felder et al. |
| 8,278,260 B2 | 10/2012 | Victor |
| 8,283,304 B2 | 10/2012 | Victor |
| 8,648,027 B2 | 2/2014 | Mitchell et al. |
| 9,006,165 B2 | 4/2015 | Mitchell et al. |
| 9,234,165 B2 | 1/2016 | Hope et al. |
| 9,826,736 B2 | 11/2017 | Napolitano et al. |
| 9,988,594 B2 | 6/2018 | Hope et al. |
| 10,358,623 B1 | 7/2019 | Mitchell et al. |
| 10,358,624 B1 | 7/2019 | Mitchell et al. |
| 2003/0073600 A1 | 4/2003 | Avery et al. |
| 2003/0228991 A1 | 12/2003 | Johnson et al. |
| 2004/0209792 A1 | 10/2004 | Mitra et al. |
| 2004/0224867 A1 | 11/2004 | Colurciello et al. |
| 2005/0026802 A1 | 2/2005 | Kilkenny et al. |
| 2005/0148264 A1* | 7/2005 | Varona ............... B08B 1/00 442/382 |
| 2005/0148655 A1 | 7/2005 | Manzer |
| 2005/0215458 A1 | 9/2005 | Lalum et al. |
| 2005/0227898 A1 | 10/2005 | Leskowicz et al. |
| 2006/0016785 A1 | 1/2006 | Egbe et al. |
| 2006/0052264 A1 | 3/2006 | Lu |
| 2006/0172912 A1 | 8/2006 | Burt et al. |
| 2006/0234899 A1 | 10/2006 | Nekmard et al. |
| 2007/0185004 A1 | 8/2007 | Kilkenny et al. |
| 2008/0261856 A1 | 10/2008 | Nakagawa et al. |
| 2008/0287331 A1 | 11/2008 | Lin et al. |
| 2010/0101605 A1 | 4/2010 | Victor |
| 2010/0249245 A1 | 9/2010 | Whiteley et al. |
| 2010/0323895 A1 | 12/2010 | Garner |
| 2011/0098206 A1 | 4/2011 | Lynch et al. |
| 2011/0211600 A1 | 9/2011 | Dantus et al. |
| 2011/0219312 A1 | 9/2011 | Kim et al. |
| 2011/0311600 A1 | 12/2011 | Polzin et al. |
| 2012/0034287 A1* | 2/2012 | Napolitano ........ C11D 1/835 424/409 |
| 2012/0227203 A1* | 9/2012 | Ouellette ............ B32B 5/022 15/209.1 |
| 2016/0128523 A1* | 5/2016 | Shwartz ............ A61Q 19/10 206/494 |
| 2018/0216044 A1 | 8/2018 | Ojha et al. |

FOREIGN PATENT DOCUMENTS

| | | |
|---|---|---|
| DE | 2627548 | 1/1977 |
| DE | 1964196 | 2/1977 |
| EP | 24031 | 5/1987 |
| WO | 2007073877 | 7/2007 |
| WO | 2008008063 | 1/2008 |
| WO | 2010101864 | 9/2010 |
| WO | 2011064554 | 6/2011 |

* cited by examiner

CLEANING WIPES HAVING PARTICULAR PORE VOLUME DISTRIBUTION CHARACTERISTICS

CROSS-REFERENCE TO RELATED APPLICATIONS

The present application claims the benefit of U.S. Provisional Patent Application No. 62/560,027 filed Sep. 18, 2017, and is also a continuation-in-part of U.S. patent application Ser. No. 15/961,663, filed Apr. 24, 2018. The disclosure of each of the foregoing is herein incorporated by reference in its entirety.

Applications bearing Clorox Docket Nos. CGIG 510.172 and CGIG 510.174 are also incorporated by reference, each in its entirety.

BACKGROUND OF THE INVENTION

1. The Field of the Invention

The present invention relates to cleaning wipes, more particularly to pre-moistened cleaning wipes that exhibit particular pore volume distribution characteristics associated with improved absorbency and desorbency, which may provide particular anti-microbial agent release characteristics so as to provide desired microefficacy, and/or that may provide the wipe with better mileage or other improved characteristics during use.

2. Description of Related Art

Numerous cleaning wipes are available, e.g., such as CLOROX DISINFECTING WIPES. While such wipes provide good overall cleaning and disinfection characteristics, versatility, and convenience, there is a continuing need for improved cleaning wipes.

BRIEF SUMMARY

The present invention relates to pre-moistened wipes that include one or more characteristics that Applicant has found to be associated with improved performance characteristics of the wipe. One such characteristic found to be associated with improved performance relates to the pore size distribution within the wipe substrate.

Such pore size distribution characteristics may aid in providing desired microefficacy characteristics. For example, the pre-loaded wipes may be free or substantially free of any biocide release agent (e.g., a cationic biocide release agent), while still releasing at least 20%, or at least 25% of a quaternary ammonium compound to a target surface during use. The wipes may exhibit at least a 3-log reduction in *Staphylococcus aureus* population within 5 minutes. By way of example, the wipes may include a substrate comprising greater than 70% (e.g., 95% or more) by weight of pulp fibers, and a cleaning composition. The cleaning composition may comprise from about 0.05% to about 5% by weight (e.g., 0.1% to 2%) of a quaternary ammonium compound, from about 0.1% to about 5% (e.g., 0.5% to 3%) by weight of a glycol ether, and from about 90% to 99% water In an embodiment, the substrate may comprise wood pulp, which may be comprised of generally ribbon-shaped fibers. The substrate may be void of or at least substantially void of synthetic fibers. For example, greater than 70%, at least 75%, at least 80%, at least 85%, at least 90%, or at least 95% of the substrate may comprise pulp fibers. Of the fibers included in the substrate, all or substantially all such fibers may comprise pulp fibers.

While synthetic and blended substrates are typically characterized by relatively small pores, having a size of less than 200 μm, the present pulp substrates may include pores that are characterized by pores having a size greater than 200 μm, such as 300 μm to 400 μm. Such larger pore sizes may account for at least a plurality, if not a majority of the pores. In other words, this pore size (i.e., greater than 200 μm, such as from 300 μm to 400 μm) will account for more of the pores than any other size range (e.g., less than 200 μm). Such determination may be made on a numerical, rather than a volumetric basis. The pulp substrates also typically exhibit a significantly lower density as compared to existing synthetic or even blended substrate materials. For example, the density (e.g., the dry density) of the pulp substrate may be less than 0.1 g/cm$^3$. In an embodiment, the pore density of the substrate may range from 225,000 per in$^2$ to 275,000 per in$^2$.

As mentioned, the wipe can be free or substantially free of a cationic or other biocide release agent, while still exhibiting desired microefficacy characteristics. Non-limiting examples of cationic biocide release agents that can be specifically excluded from the wipes include, but are not limited to cationic salts, latex, and other cationic binders. While such components may serve to increase release of the quaternary ammonium compound, they typically result in other problems with the wipe (e.g., streaking, filming, negative effects on hand feel, stiffness, etc.). For these reasons, the addition of such materials, particularly in significant amounts, may be avoided, while still achieving sufficient quaternary ammonium compound release to meet a desired microefficacy threshold.

For purposes of clarity, it is noted that some materials that may technically qualify as cationic binders may be used to some extent in most any paper-making process, not as a binder, but as a processing aid. In other words, materials that have applicability both as binders and processing aids may be used in small amounts as a processing aid for wet strength in pulp substrate processing. Examples of such materials include KYMENE, cellulose gum, sodium carboxymethylcellulose (CMC) or the like. Such materials may be present at low levels (e.g. less than 1% by weight, less than 0.5% by weight, less than 0.2% by weight, less than 0.1% by weight, less than 0.05%, or the like) in the inventive wipes, not as binders, but simply because they are commonly used in the manufacture of pulp substrate materials (e.g., as a processing aid). Some paper-making processes, such as airlaid and wetlaid pulp based substrates do not necessarily include such components at all.

The cleaning composition may be pre-loaded into the substrate of the wipe during manufacture, at a loading ratio that is less than saturation, e.g., from 2:1 to 6:1, or from 2:1 to 4:1. Full saturation for such pulp substrates may typically be at a loading ratio of 8:1 or more (i.e., the substrate may be capable of holding at least 8 g of cleaning composition for each gram of substrate weight). As mentioned, the pulp substrate is typically not loaded to full saturation, but may be specifically loaded to a ratio that is less than full saturation, e.g., up to a loading ratio of 6:1, 5:1, 4:1, for example from 2:1 to 4:1, or from 2.5:1 to 3.75:1. The substrate may include a localized texture (e.g., where the pulp fibers are present at an increased density at the location of localized texture, creating such a texture).

The wipe may include other characteristics found by the present inventors to also provide improved performance. For example, the wipe may exhibit particular dosing profile or retention characteristics relative to the cleaning composition, where the substrate has less of a tendency to "dump" cleaning composition quickly upon first use as compared to existing wipes based on synthetic or blended fiber substrates. For example, the wipe may exhibit retention of at least 50% of the cleaning composition when squeezing (or centrifuging) the composition from the wipe under particular controlled conditions. As described, existing wipes based on synthetic or blended substrates tend to dump far more of the cleaning composition under the same conditions, while also retaining a large fraction of the quaternary ammonium compound bound to the substrate, particularly where cationic release agents are not present.

The wipe may also exhibit improved "hand feel" as measured by the stiffness and tensile strength characteristics of the wipe. The wipe may exhibit particular wet bulk factor characteristics, where wet bulk factor is defined as the ratio of the profile height of the dry substrate, relative to the profile height of the substrate following wetting and redrying. The wipe may exhibit particular mileage absorbency/desorbency factor (MABDF) characteristics, where MABDF is defined as:

$$\frac{(R+P+S)}{(\rho+TS)}$$

where R is the percentage of composition retained upon squeezing (or centrifuging), P is the percentage of pulp in the substrate, S is the stiffness of the wipe (in mg·cm), $\rho$ is the density of the wipe (in gm/cm$^3$), and TS is the tensile strength of the substrate (in lb$_f$, as measured in the machine direction). MABDF empirical values may be determined for both wet and dry conditions, and averaged. MABDF values for the present wipes are significantly higher than for existing wipes, particularly those based on synthetic fiber substrates or blended fiber substrates. MABDF is an empirical measure capturing many of the characteristics described herein. For example, calculation of MABDF can quickly predict how well the substrate will retain a cleaning composition, while delivering it in a relatively uniform manner over the useful life of the wipe, as opposed to quickly "dumping" the composition well before the durability characteristics of the substrate have been expended.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings.

DETAILED DESCRIPTION OF THE PREFERRED EMBODIMENTS

I. Definitions

Figure 1A:
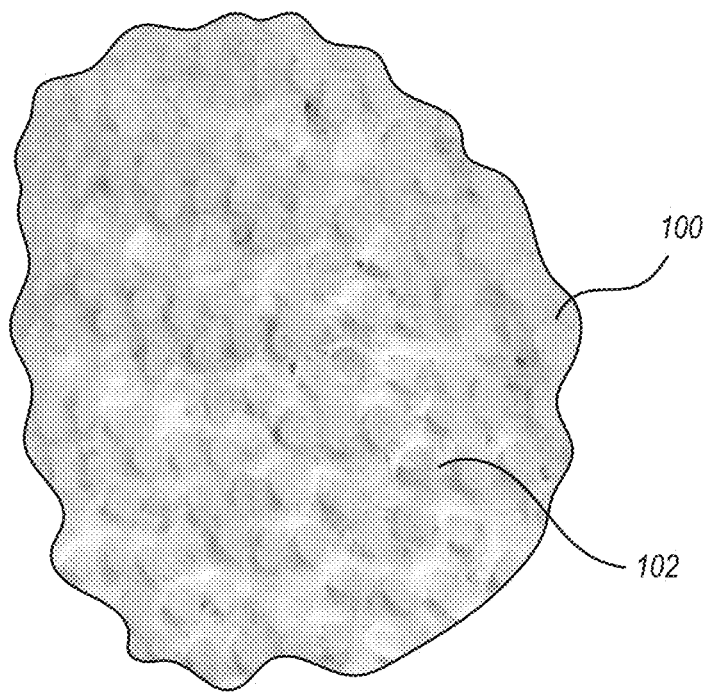
FIGS. 1A-1B show photographs of an exemplary wipe, including a substrate having a localized texture, with localized regions of high fiber density.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

As used herein, "disposable" is used in its ordinary sense to mean an article that is disposed or discarded after a limited number of usage events, preferably less than 25, more preferably less than about 10, and most preferably after a single usage event. The wipes disclosed herein are typically disposable.

As used herein, the term "substrate" is intended to include any material that is used to clean an article or a surface. Examples of cleaning substrates include, but are not limited to, wipes, mitts, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. These substrates can be used for hard surface, soft surface, and personal care applications. Such substrates may typically be in the form of a wipe.

Such substrates may be formed of a structure of individual fibers which are interlaid, typically in a manner that is not identifiable, similar to a nonwoven. The pulp substrates may be formed by any suitable process, typically through wet-laying, although airlaying may also be possible. The basis weight of the pulp or tissue substrate may be expressed in grams per square meter (gsm). The fibers of the substrate may generally be ribbon-shaped, rather than the generally circular fiber geometry of synthetic fibers commonly used in synthetic nonwovens.

The terms "wipe", "substrate" and the like may thus overlap in meaning, and while "wipe" may typically be used herein for convenience, it will be appreciated that this term may often be interchangeable with "substrate".

As used herein, "wiping" refers to any shearing action that the wipe undergoes while in contact with a target surface. This includes hand or body motion, substrate-implement motion over a surface, or any perturbation of the substrate via energy sources such as ultrasound, mechanical vibration, electromagnetism, and so forth.

The cleaning compositions dosed onto the substrate as described herein may provide sanitization, disinfection, or sterilization. As used herein, the term "sanitize" shall mean the reduction of "target" contaminants in the inanimate environment to levels considered safe according to public health ordinance, or that reduces a "target" bacterial population by significant numbers where public health requirements have not been established. By way of example, an at least 99% reduction in bacterial population within a 24 hour time period is deemed "significant." Greater levels of reduction (e.g., 99.9%, 99.99%, etc.) are possible, as are faster treatment times (e.g., within 10 minutes, within 5 minutes, within 3 minutes, within 2 minutes, or within 1 minute), when sanitizing. As used herein, the term "disinfect" shall mean the elimination of many or all "target" pathogenic microorganisms on surfaces with the exception of bacterial endospores. As used herein, the term "sterilize" shall mean the complete elimination or destruction of all forms of "target" microbial life and which is authorized under the applicable regulatory laws to make legal claims as a "sterilant" or to have sterilizing properties or qualities. Some embodiments may provide for at least a 2 or more log reduction in a bacterial population within a designated time period (e.g., 10 minutes, 5 minutes, 3 minutes, 1 minute, 30 seconds, 10 seconds or the like). A 2-log reduction is equivalent to a 99% reduction, a 3-log reduction is equivalent to at least a 99.9% reduction, a 4-log reduction is equivalent to at least a 99.99% reduction, a 5-log reduction is equivalent to at least a 99.999% reduction, etc. An example of a target microbe may be *Staphylococcus aureus*. It will be appreciated that microefficacy can also be achieved against other target microbes, numerous examples of which will be apparent to those of skill in the art.

The term "texture" as used herein refers to the character or appearance of a substrate as determined by the arrangement and thickness of its constituent fibers." Texture can be quantified using imaging techniques and/or caliper measurements at the local and macro scales, as described herein.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to pre-moistened wipes that include one or more characteristics that Applicant has found to correlate to desired properties, such as high durability, mileage, cleaning composition retention, efficacy, or the like. By way of explanation, pulp substrates typically include an anionic charge, which causes a cationic biocide such as a quaternary ammonium compound to be attracted to, and preferentially bound or otherwise retained within the substrate, even while the remainder of the composition is released from the wipe (e.g., through squeezing, wiping or other compression). In one embodiment of the invention, the present wipes are tailored to release at least 20%, or at least 25% of the quaternary ammonium compound to a target surface, and exhibit at least a 3-log reduction in *Staphylococcus aureus* population within 5 minutes, or within 1 minute, or within 30 seconds, or within 10 seconds. Such release and efficacy is achievable without the presence of any intentionally post-added or otherwise added cationic biocide release agent (e.g., latex or a cationic salt) included in the cleaning composition or elsewhere within the pre-loaded disinfecting wipe.

The present wipes may include various other beneficial characteristics. For example, many existing wipes have a tendency to "dump" the cleaning composition loaded therein, when first used to clean a desired surface. In other words, the bulk of the cleaning composition tends to be released very quickly, over a relatively small portion of an overall surface area to be cleaned, rather than exhibiting a more controlled, uniform dosing profile by which a more limited amount of the composition would be released over the portions of the surface area being first treated, leaving more composition for later treated portions of the surface area. For example, the dosing profile of existing cleaning wipes delivers most of the composition to the first area contacted, and delivers far less cleaning composition to areas contacted afterwards, as so little composition remains in the wipe after first contact. The present wipes may advantageously provide for increased mileage, meaning that they exhibit a tendency to deliver the cleaning composition in a more uniform dosing profile, so as to cover, treat, or clean a greater surface area with a more uniform distribution of the cleaning composition for a given wipe.

One particular characteristic that the present wipes exhibit, which has been found to correlate to and/or provide such benefits, and which is not present within existing wipes products relates to pore size distribution. While synthetic and blended substrates are typically characterized by relatively small pores, having a size of less than 200 µm, the present pulp substrates may include pores that are characterized more by pores having a size greater than 200 µm, such as 300 µm to 400 µm. Pore density of the substrate may range from 225,000 per in$^2$ to 275,000 per in$^2$.

III. Exemplary Wipes

FIG. 1A illustrates an exemplary wipe including a substrate that may be dosed with a cleaning composition. The illustrated substrate 100 includes regions of localized high fiber density. Such regions create the appearance on a macro-scale of a texture, including raised ridges 102, as shown. Such texture may be permanent, e.g., having been introduced into the substrate structure as a result of the geometry used in the forming screen used when depositing the pulp fibers that make up the substrate, as opposed to an embossing procedure which merely embosses a raised texture into an already formed substrate after wet-laying or air-laying. Such post-formation embossed textures are typically not permanent, but are removed from the substrate upon wetting. The presently described permanent texture of raised ridges 102 as shown is permanent, meaning that this structural feature is retained even upon wetting (and any subsequent redrying).

Figure 2A:
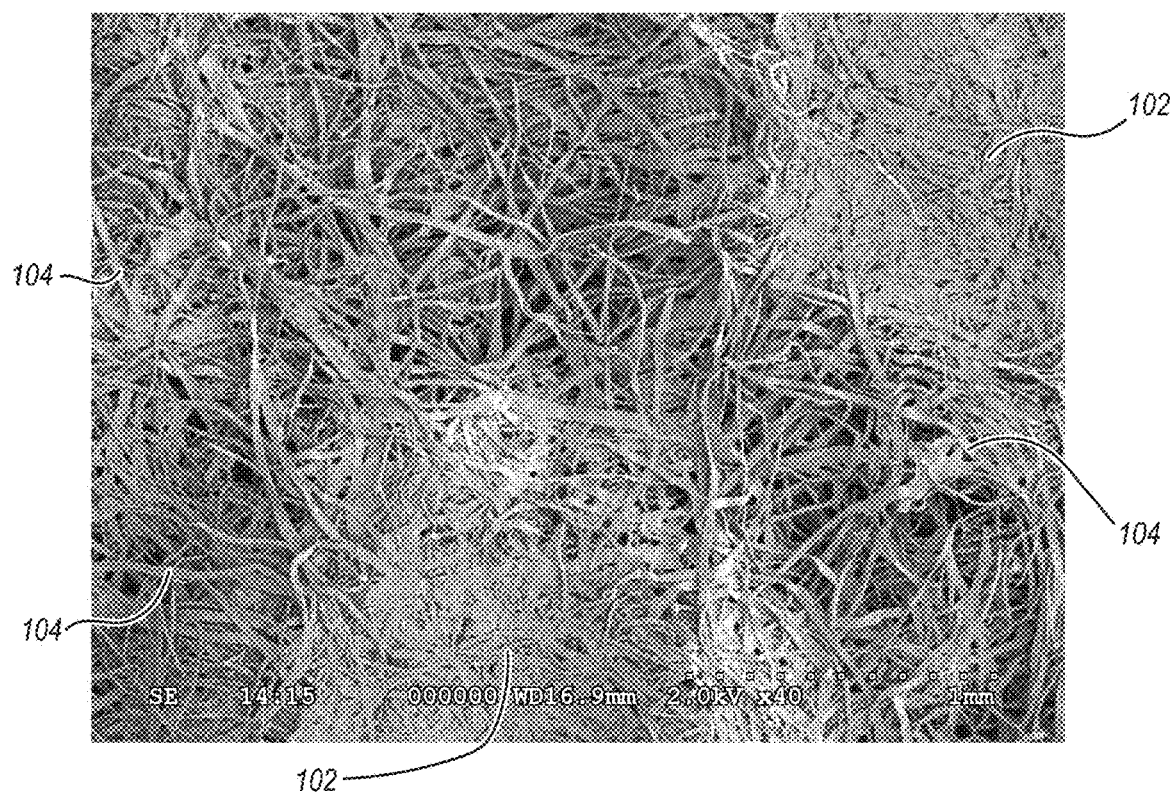
FIGS. 2A-2B are SEM images of the wipe of FIG. 1A, showing the generally ribbon-shaped pulp fibers, the localized regions of high fiber density (where fibers appear "matted" together), and the porous structure of the substrate.
Figure 2B:
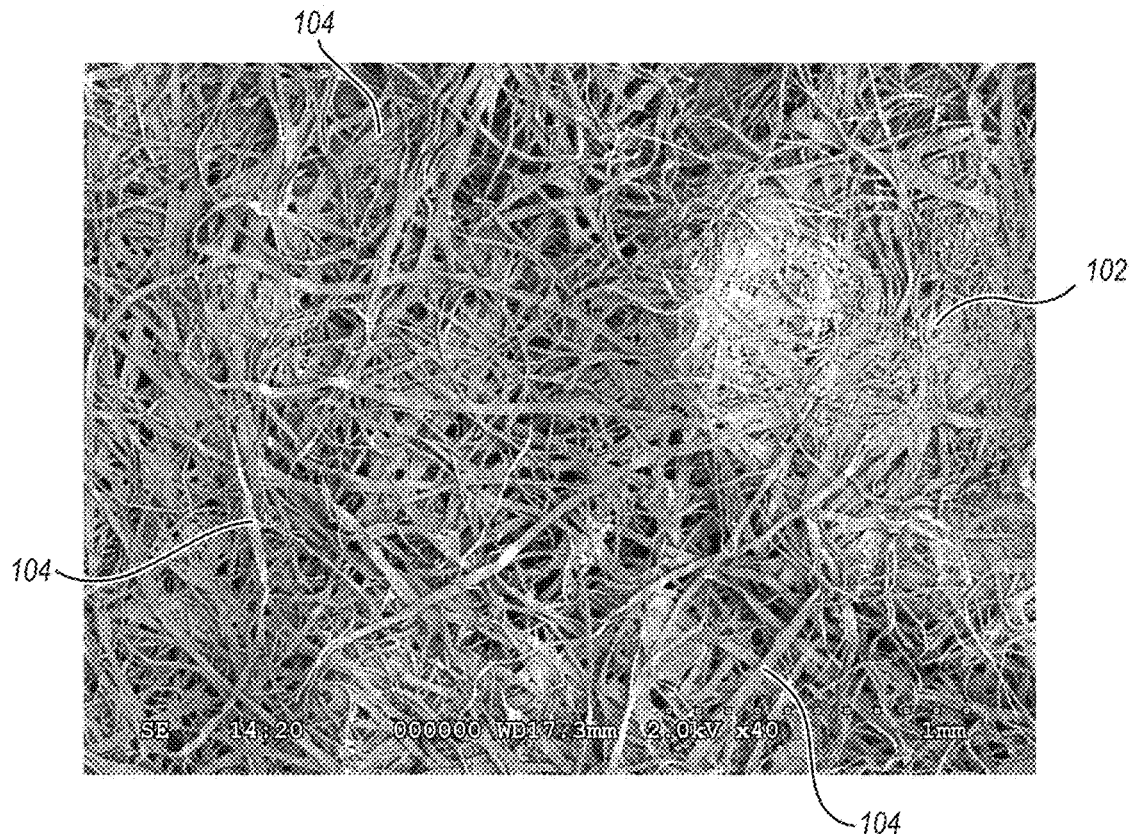

FIGS. 2A-2B show SEM images of the substrate seen in FIG. 1A, clearly showing the generally ribbon shape of the individual pulp fibers 104 of the substrate 100, as well as the localized regions of high fiber density 102, where masses of the generally ribbon-shaped fibers 104 appear to be matted together. As noted above, such regions 102 of localized high fiber density providing the textured appearance seen in FIG. 1A are formed during depositing of the pulp fibers, through selection of an appropriate screen geometry, which allows such regions of localized high fiber density to be deposited during wet-laying or air-laying. Such a screen may include high and low regions, so that the lower recessed regions and higher protruding regions may receive differing densities or thicknesses of pulp fibers, resulting in the permanent texture that is retained even upon wetting.

a. Pulp Characteristics

The substrates employed in the present invention are formed predominantly, and preferably entirely, from pulp fibers, e.g., wood pulp or other plant fibers. While the substrate may generally comprise greater than 70% by weight of pulp fibers, such that other types of fibers or other components may be present, in an embodiment, far higher fractions of the substrate (or at least the fibers thereof) are comprised of pulp fibers, e.g., at least 75%, at least 80%, at least 85%, at least 90%, at least 95%, at least 97%, at least 98%, or at least 99%. In an embodiment, the substrate consists of or consists essentially of pulp fibers.

Such pulp fibers may typically be obtained from wood, although other possible sources of pulp are also possible, e.g., from cotton, Esparto grass, bagasse, hemp, flax, jute or the like. Combinations of more than one material may be used. Various exemplary pulp fibers may include, but are not limited to, thermomechanical pulp fibers, chemimechanical pulp fibers, chemithermomechanical pulp fibers, refiner mechanical pulp fibers, stone ground wood pulp fibers, peroxide mechanical pulp fibers, and the like. The fibers of the pulp substrate may generally comprise cellulosic fibers, which are typically hydrophilic. Such hydrophilicity differs from many synthetic fibers, which are typically hydrophobic, absent special treatment.

In one embodiment, the pulp fibers are selected from softwood and hardwood varietals, including but not limited to, Maple, Ash, Hard Pine, Spruce, Hemlock, Fir, White Pine, Red Pine, *Eucalyptus, Populus* spp. Birch, Basswood, Beech, Redgum, Cherry, Hornbeam, Yellow-Poplar, Douglas-Fir, and other suitable varietals of wood. Typically the pulp substrates have a mixture of fibers selected from the group consisting of: hardwood, softwood, bleached fibers and kraft fibers and any combinations or mixtures thereof. Surprisingly, the type of fibers and mixture of the fibers within a substrate has a significant impact on its performance not just with respect to softness or absorbency, but also with respect to dosing and release of the quaternary ammonium compound from the substrate. Specifically, substrates with a high percentage of fibers, e.g., greater than 50% by weight, that come from bleached pulp fibers with a length weighted L(w) between about 1 mm to about 4 mm, more preferably between about 2 mm and 3 mm, correlate with substrates having superior performance for cleaning applications and quat release (e.g greater than 25%, or greater than 30% release by weight, etc.). Conversely, pulp substrates comprising a high percentage of bleached pulp fibers, e.g., greater than 50% by weight, that come from bleached pulp fibers with a length weighted L(w) less than about 2 mm, or more specifically less than about 1 mm, correlate with substrates having poor performance for cleaning applications and inferior quat release (e.g., less than 20%, or less than 25% by weight). It was unexpected that the L(w) of fibers within a substrate would have a significant impact on the performance of the present wipes.

By way of further description, softwood fibers, such as various species of evergreens (e.g., spruce, hemlock, firs, pines, etc), may typically provide for the desirable longer fiber lengths (e.g., L(w) greater than 2 mm, such as values between 2.1 mm and 3 mm). Hardwood fibers, such as various species of maple, eucalyptus, ash, populous spp., birch, basswood, beech, redgum, cherry, hornbeam, yellow-poplar, and other hardwoods typically provide shorter fiber lengths, e.g., less than 2 mm, more typically less than 1 mm. While it may be desirable to include some shorter length and/or hardwood fibers in the blend of the pulp employed, the fraction of such shorter length fibers and/or hardwood fibers may be limited to less than 50%, less than 45%, less than 40%, or less than 35% by weight of the pulp blend. For example, Applicant has found that such shorter length fibers tend to exhibit greater anionic charge, so as to exhibit a greater tendency to interfere with the desired quat release. In addition, such shorter length fibers may close up the substrate, reducing air permeability, and/or negatively affect desirable pore characteristics as described herein. Similarly, the fraction of the longer length fibers and/or softwood fibers may be at least 50%, at least 55%, at least 60%, or at least 65%.

Another characteristic that may be used to characterize the pulp fibers is the number of fibers per gram, which is typically reported in millions of fibers per gram. For example, the softwood, longer length pulp fibers may have values that are less than 10 million fibers/g, less than 8 million fibers/g, less than 6 million fibers/g, or less than 5 million fibers/g. Such pulp fibers may also have fibers that are at least 1 million fibers/g, or at least 2 million fibers/g (e.g., from 1 to 6, or from 2 to 5 million fibers/g.). In contrast, the hardwood, shorter length pulp fibers typically have values that are far higher, such as more than 10 million fibers/g, more than 12 million fibers/g. more than 15 million fibers/g. For example, exemplary softwood kraft pulp may have an L(w) value of about 2.2, and a population value of about 4.5 million fibers/g. Another exemplary softwood kraft pulp may have an L(w) value of about 2.5, and a population value of about 2.4 million fibers/g. In contrast, an exemplary maple hardwood pulp may have an L(w) value of about 0.6, and a population value of about 27.6 million fibers/g. An exemplary eucalyptus hardwood pulp may have an L(w) value of about 0.8, and a population value of about 19.8 million fibers/g.

Preferably, the substrate includes only limited amounts, or does not include any added synthetic fibers, e.g., such as various polyolefins or other fibers formed from synthetic polymers, e.g., polyethylene, polypropylene, PET, PVC, polyacrylics, polyvinyl acetates, polyvinyl alcohols, polyamides, polystyrenes, or the like. While such synthetic fibers are widely used in the manufacture of nonwoven substrates, Applicant has discovered that the use of a pulp substrate, in combination with the various other characteristics described herein, allows production of a wipe which can provide functional advantages over synthetic nonwoven wipes, and which may also be consumer preferred, or at least comparable, for consumer perceptions of durability, safe for use on all surfaces, ease and convenience, ability to clean and absorb light liquid spills, and ability to clean large areas effectively. Furthermore, the use of synthetic nonwoven substrates in existing pre-moistened wipes represents a significant expense, such that cost savings, renewability and sustainability benefits, and biodegradability benefits can be achieved using pulp substrates, as described herein.

The pulp substrate can be formed by a number of different techniques, e.g., such as any of those suitable for use in forming paper towels. Examples include, but are not limited to wet-laying and air-laying techniques. Methods of making such substrates will be apparent to those of skill in the art. Wet-laying processes are described in U.S. Pat. Nos. 5,246,772 and 5,238,534 to Manning. Air-laying processes are described in U.S. Patent Publication No. 2003/0036741 to Abba et al. and U.S. Patent Publication No. 2003/0118825 to Melius et al. Such processes will be familiar to those of skill in the art, in light of the present disclosure. The present pulp substrates preferably include localized regions of high texture, where the profile is raised (e.g., above or below the central generally planar surface otherwise defined by the substrate), and the density of fibers is increased in such localized high fiber density regions, as seen in FIG. 1A.

Such regions of high texture (i.e., high fiber density) are a characteristic of the substrate that is manifested on a micro-scale, rather than a macro-scale. By way of further explanation, the bulk or macro density of any given nonwoven substrate may be easily determined by dividing the basis weight (gsm) of the nonwoven material by its caliper thickness (e.g., measured using a caliper that measures thickness at a constant pressure, such as 0.1 psi).

The localized texture associated with high fiber density regions is an entirely different characteristic than the bulk or macro density. For example, such localized texture is a surface characteristic of the substrate and there may be little or no difference in the bulk or macro density within the high fiber density region (102 in FIGS. 1A-2B) as compared to the region surrounding such "islands" of high fiber density. As described herein, such high fiber density regions are visible from a surface image of the substrate and are characterized by the pulp fibers in that region being more closely matted, fused, joined, compacted, or otherwise combined into the region 102. Such characteristic is readily apparent in the SEM images of FIGS. 2A and 2B.

Such high fiber density regions may be characterized by lower air permeability as compared to the surrounding regions. That said, measurement of the mass of such tiny regions (e.g., typically length and/or width of less than 1 mm) is not practical, nor is measurement of air permeability of such small regions using a Frazier air permeability tester, or the like. SEM imaging of such substrates though is readily practical, and can be used to indirectly measure air permeability and/or fiber density characteristics. For example, such an image analysis technique may include analyzing a gray scale image with software such as ImageJ. ImageJ is a public domain image processing tool developed by National Institutes of Health (NIH).

Such a method of image analysis may include loading the gray scale image of the substrate into ImageJ, and selecting visibly differentiated high and low density regions using the selection tool. Using the rectangular selection tool, the size may be set to 250×250 pixels, for example. The ImageJ tool "Plot profile analysis" can be run on the selected regions, which reports a median gray value (between 0 and 255) for the particular selection. In such scale, the "0" value corresponds to full black, while the "255" value corresponds to full "white", and all values in between correspond to various shades of gray within the 8-bit resolution. High fiber density regions exhibit gray scale values under such analysis that are lighter in color (i.e., towards "255"), while the surrounding lower fiber density regions exhibit gray scale values under such analysis that are darker in color (i.e., towards "0").

Figure 2C:
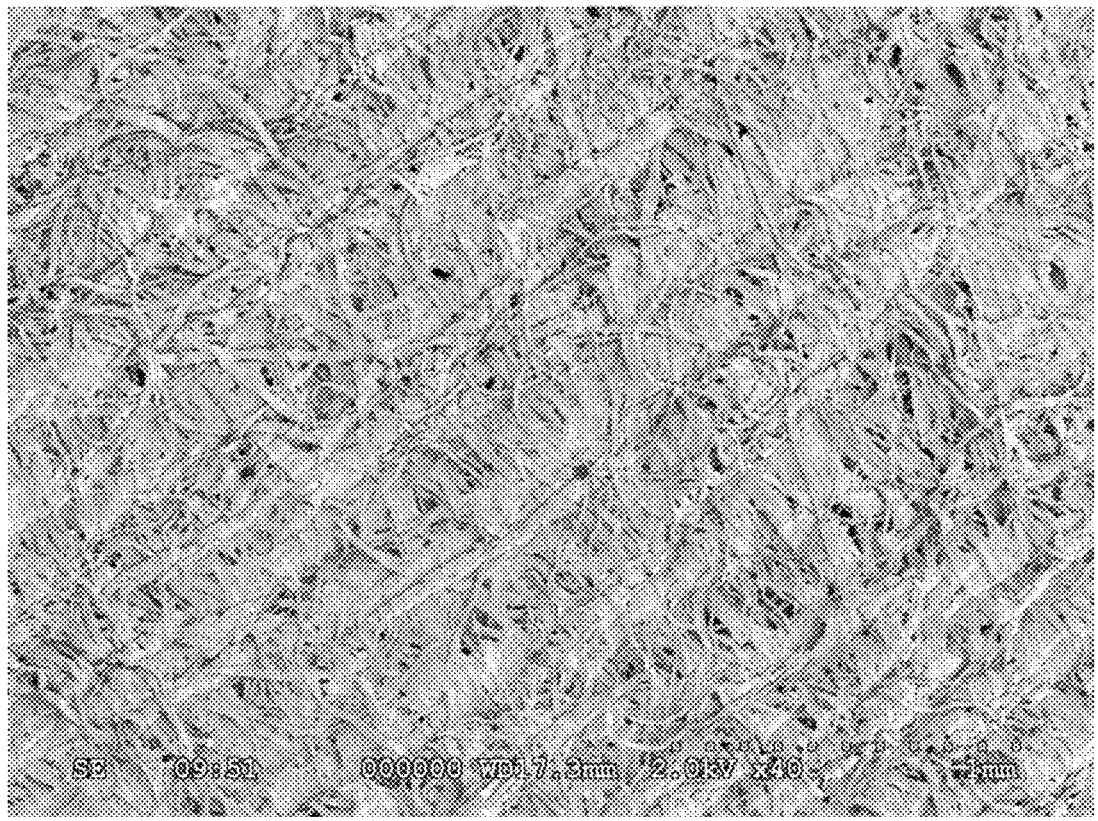
FIG. 2C is an SEM image of a comparative substrate, without localized regions of high fiber density.

By way of further example, analysis Figures such as 2A and 2B may produce a gray scale median value of "134" for the high fiber density regions, while the surrounding lower fiber density regions may produce a gray scale median value of "104". In general, the high fiber density regions may be at least 20 value points greater, or at least 25 value points greater than the surrounding lower fiber density regions when compared by such an analysis on an 8-bit gray scale. Even if the SEM image were obtained under different conditions, while the absolute average gray scale values may differ, the high fiber density regions would still have a relatively higher gray scale value as compared to the surrounding lower fiber density regions, and the actual point value of such difference may still be, more than 20 points on an 8-bit scale. For comparison, FIG. 2C illustrates an SEM image of another substrate, which does not include such regions of relatively higher fiber density.

b. Multi-Ply Pulp Substrates

In an embodiment, the pulp substrate may be formed of only a single ply of pulp fibers. In another embodiment, the pulp substrate may comprise two or more plies that have been laminated or otherwise adhered together. Because the pulp substrate will be dosed during manufacture with a cleaning composition, and stored for long periods of time in such wetted condition, if a multi-ply configuration for the pulp substrate is employed, it may be important that the structure of the multi-ply configuration remain stable, without separating, for an extended period of time (e.g., 12 months or more). Such requirements differ from typical paper towel of other tissue materials (e.g., bath tissue) that may be formed of two or more plies. For example, typical methods for combining two tissue plies or layers together involve roll coating, in which the tissue layers, which typically include an embossed texture of peaks and valleys, are passed over a drum or cylinder that applies a low viscosity adhesive coating onto the peaks of the tissue layer, as the peaks contact the drum or cylinder. The tissue layers are then laminated together as they pass through a nip between two rollers, effectively gluing the two tissue layers together.

With such 2-ply paper towels, it is important that they meet the FDA or similar foreign regulatory requirements for food contact (e.g., GRAS ingredients only, as listed in 21 CFR § 184). The adhesive used must be easy to apply and widely available, and must be applied at very low levels to prevent the final product from feeling "stiff", which is unacceptable in a paper towel product. A very dilute solution of water soluble polyvinyl alcohol (PVOH) is often used as the adhesive to adhere two such plies together.

Pulp substrate that may be formed as a multi-ply substrate according to the present invention include very different requirements. The present wipes are not required to meet FDA food contact approval, such that components that are not listed on the FDA GRAS listing may be used. In addition, because the substrate will be dosed during manufacture with a cleaning composition and remain wetted for an extended period of time (e.g., 12 months or more of storage), the stiffness of the dry substrate is not a primary concern. Furthermore, it is important that the adhesive employed must not delaminate when such a multi-ply substrate is loaded with the cleaning composition, and the substrate and wipe must be stable and remain efficacious (e.g., antimicrobial efficacy for a sanitizing or disinfecting wipe) in the dosed configuration for at least 12 months.

PVOH is available in a variety of grades, varying by degree of hydrolysis and the molecular weight of the polymer. Grades of PVOH known as "partially" hydrolyzed are often 87% to 89% hydrolyzed. "Fully" hydrolyzed PVOH may be 98% hydrolyzed, or greater (e.g., 98% to 100%). PVOH materials also differ widely in the degree of polymerization, and resulting molecular weight. PVOH molecular weights may range from 13,000 Daltons to 200,000 Daltons. For PVOH with an ultra-low degree of polymerization (e.g., n=150 to 300), the molecular weight may be from 13,000 Daltons to 23,000 Daltons. For a low degree of polymerization (e.g., n=350 to 650) the molecular weight may be from 31,000 Daltons to 50,000 Daltons. For a medium degree of polymerization (e.g., n=650 to 1500) the molecular weight may be from greater than 50,000 Daltons to 124,000 Daltons. For a high degree of polymerization (e.g., n=1600 to 2200) the molecular weight may be from greater than 124,000 Daltons to 200,000 Daltons.

Varying the degree of hydrolysis and the molecular weight impacts the properties of the polymer and has implications for manufacturing usage and final adhesive properties. PVOH with relatively lower molecular weight and a lower degree of hydrolysis is more soluble in water for both the initial processing and after being cast as an adhesive, creates less viscous solutions, and forms more flexible coatings. Additional details of PVOH adhesives are found in Provisional Application 62/560,027, already incorporated by reference. For reasons described above, existing processes for laminating together multiple plies of tissue (e.g., for use as dry paper towels) by necessity employ fully water-soluble, ultra-low or low molecular weight PVOH adhesives that are only partially hydrolyzed.

In contrast, in at least one embodiment of the present invention, it is important that any employed PVOH not be fully water soluble so that the multi-ply pulp substrate does not delaminate when it is loaded with the aqueous cleaning composition. In addition, a pre-loaded wipe according to the present invention can benefit from increased tensile strength and adhesive strength provided by a fully hydrolyzed PVOH with a medium to high molecular weight because multi-ply pulp substrates tend to lose a significant fraction of their tensile strength and stiffness upon loading with the cleaning composition. In existing multi-ply tissue products the additional stiffness, increased tensile strength and decreased absorbency would be undesirable. Conversely, in the context of the present invention the increased stiffness, tensile strength and decreased solubility may actually be beneficial. Such benefits are at least partially achieved due to selection of a highly hydrolyzed PVOH with a medium to high molecular weight. For example, the molecular weight of the PVOH may be at least 50,000 Daltons, at least 60,000 Daltons, at least 70,000 Daltons or at least 80,000 Daltons. The PVOH may be at least 90% hydrolyzed, at least 92% hydrolyzed, at least 94% hydrolyzed, at least 95% hydrolyzed, or at least 98% hydrolyzed.

In addition to such chemical differences in the PVOH employed, the solution or suspension of PVOH adhesive may include a far higher loading of PVOH. In other words, it is not a very dilute solution, as would be employed in existing processes. For example, the adhesive suspension or solution may include at least 20%, at least 30%, from 25% to 60%, from 30% to 50%, or about 40% PVOH solids content. In addition to using a more viscous, solids loaded adhesive suspension or solution in manufacture, the present invention may apply more of the adhesive onto the tissue layer(s) as compared to existing processes. For example, the weight fraction of adhesive added to permanently bond the two layers together may be greater than 2%, or greater than 3%, such as 3% to 6% relative to the total weight of the substrate (i.e., pulp plus adhesive).

As compared to typical paper towel manufacture, the present wipes do not need to be able to absorb large volumes of aqueous spills. Because of this, the present wipes can have much higher amounts of adhesive as compared to existing paper towel products. The present wipes are pre-dosed, during manufacture, and are not intended to be so absorbent, for cleaning-up spills. Any minor decrease in absorbency caused by the presence of the relatively large quantity of adhesive is acceptable within the present substrates, as massive absorbency is not critically important. An additional benefit of using such a higher level of adhesive and a more hydrolyzed variety of the adhesive is that this may reduce or minimizes exposure of binding sites on the anionic pulp substrate that might otherwise bind the cationic biocide (e.g. quaternary ammonium, biguanide) included in the cleaning composition. This may enable improved delivery of the cationic biocide to the surface being treated. An increased release rate for the quaternary ammonium or other cationic biocide from the wipe is desirable so that lower actives levels may be used while providing the same efficacy for cleaning, disinfecting or sanitizing applications.

In addition to high molecular weight, high hydrolyzed values, high solids content in the adhesive, and higher levels of adhesive application, the water solubility of the adhesive may be further reduced by cross-linking the adhesive. Such may be achieved by adding a cross-linking agent to the PVOH, or other suitable adhesive. Other suitable adhesives for an inventive 2-ply substrate include but are not limited to, polyvinyl acetate copolymers, vinyl acetate copolymers, ethylene vinyl acetate (EVA) copolymers or polyethylene vinyl acetate (PEVA) copolymers. EVA and PEVA are the copolymer of ethylene and vinyl acetate. EVA is an elastomeric polymer which is tough and waterproof which makes it a good adhesive for the inventive wet cleaning wipe. Examples of suitable cross-linking agents will be apparent to those of skill in the art. These types of materials are generally described in U.S. Pat. Nos. 3,855,158; 3,899,388; 4,129,528; 4,147,586; and 4,222,921, each of which is incorporated herein by reference in its entirety.

Glyoxalated polyacrylamide resins may also be used to increase wet strength. Examples of such resins are described in U.S. Pat. Nos. 3,556,932 and 3,556,933, each of which is incorporated herein by reference in its entirety.

Such adhesives can be used to adhere any two or more layers together without them falling apart or otherwise delaminating, even when pre-dosed with the cleaning composition and stored for 12 months or more in such a wetted condition. While the present wipes are principally contemplated to be provided in stacks of such wipes, it may be possible to cast a film of PVOH having characteristics as described herein between adjacent pulp layers to create a stiffer and stronger structure that may even be sufficiently strong to accommodate conversion into a donut (e.g., the donut or roll configuration of Clorox Disinfecting Wipes in a cylindrical canister) so as to allow dispensing from a cylindrical canister. Increasing the stiffness and/or tensile strength of the pulp substrate allows for dispensing container options that would not otherwise be possible. Such characteristics of increased stiffness and strength may counteract the typical increased tendency for substrates to tear when packaged in such a donut configuration. In a similar manner, such increased stiffness and/or strength may also counteract the tendency of pulp substrates to collapse once wetted, if provided in a donut configuration. In addition, in dispensing a single wipe from a donut configuration, there is relatively high friction between the wipes, thus requiring a high degree of force to pull them apart. With typical pulp substrates, such forces are sufficient to result in undesirable tears. Increased stiffness and/or strength as provided by a PVOH adhesive may aid in overcoming such obstacles, so as to allow dispensing such pulp substrates from a donut configuration.

While PVOH is principally described as a suitable adhesive for laminating multiple plies together, other types of polymer adhesives can similarly be used. In addition, such adhesives could be included, even where the substrate is not multi-ply, e.g., simply to provide increased stiffness or other properties. Examples of adhesives other than PVOH that may be suitable for use include, but are not limited to, rubber latex emulsions, vinyl emulsions, acrylic resins, and any combinations or mixtures thereof. Additional information about suitable alternative adhesives is found in Provisional Application 62/560,027, already incorporated by reference. As noted previously, in at least some embodiments, the wipes may be free or substantially free of cationic latex.

c. Other Characteristics

The size and shape of the wipe can vary with respect to the intended application and/or end use of the same. The cleaning substrate can have a substantially rectangular shape of a size that allows it to readily engage standard cleaning equipment or tools such as, for example, mop heads, duster heads, brush heads, mitten shaped tools for wiping or cleaning, and so forth. In another embodiment, another shape, e.g., circular, oval, or the like) may be provided.

The wipes or other cleaning substrates may be provided pre-moistened with a cleaning composition. Such composition may include an antimicrobial agent (e.g., a quaternary ammonium compound), to provide sanitization or disinfection. The wet cleaning substrates can be maintained over time in a sealable container such as, for example, within a bucket or tub with an attachable lid, sealable plastic pouches or bags, canisters, jars, and so forth. Desirably the wet, stacked cleaning substrates are maintained in a resealable container. The use of a resealable container is particularly desirable when using aqueous volatile liquid compositions since substantial amounts of liquid can evaporate while using the first sheets thereby leaving the remaining sheets with little or no liquid. Exemplary resealable containers and dispensers include, but are not limited to, those described in U.S. Pat. No. 4,171,047 to Doyle et al., U.S. Pat. No. 4,353,480 to McFadyen, U.S. Pat. No. 4,778,048 to Kaspar et al., U.S. Pat. No. 4,741,944 to Jackson et al., U.S. Pat. No. 5,595,786 to McBride et al.; the entire contents of each of the aforesaid references are incorporated herein by reference.

With regard to pre-moistened substrates, a selected amount of liquid may be added to the container during manufacture such that the cleaning substrates contain the desired amount of liquid. As described herein, preferably the substrates are not loaded to their saturation point, but are loaded with the cleaning composition to some ratio less than full saturation. For example, many substrates are capable of holding about 8 to 14 times their weight in liquid. For reasons described herein, the substrates may be loaded at a loading ratio less than saturation, e.g., less than 6:1, less than 5:1, less than 4:1, such as from 1:1 to 4:1, from 2:1 to 4:1, from 2.5:1 to 3.5:1, from 2.5:1 to 3:1 or from 2.5:1 to 3.75:1.

Typically, the cleaning substrates are stacked and placed in the container and the liquid subsequently added thereto, all during mass manufacturing. The substrate can subsequently be used to wipe a surface. The moistened cleaning substrates can be used to treat various surfaces. As used herein "treating" surfaces is used in the broad sense and includes, but is not limited to, wiping, polishing, swabbing, cleaning, washing, disinfecting, scrubbing, scouring, sanitizing, and/or applying active agents thereto.

As used herein the term "liquid" includes, but is not limited to, solutions, emulsions, suspensions and so forth. Thus, liquids may comprise and/or contain one or more of the following: disinfectants; antiseptics; diluents; surfactants, such as nonionic, anionic, cationic; waxes; antimicrobial agents; sterilants; sporicides; germicides; bactericides; fungicides; virucides; protozoacides; algicides; bacteriostats; fungistats; virustats; sanitizers; antibiotics; pesticides; and so forth. Examples of some such components are included in, but not limited to, U.S. Pat. Nos. 6,825,158; 8,648,027; 9,006,165; 9,234,165, and U.S. Publication No. 2008/003906 each of which is herein incorporated by reference in its entirety. In some embodiments, it may be possible to provide the substrates in dry form, where dosing with a selected cleaning composition may occur later (e.g., by the user).

The wipes or other cleaning substrates of the present invention can be provided in a kit form, wherein a plurality of cleaning substrates and a cleaning tool are provided in a single package.

In addition to material composition (e.g., pulp substrate, composition of the cleaning "lotion" and the like), wipe or other substrate dimensions can also be used to control dosing as well as provide ergonomic appeal. In one embodiment, substrate dimensions are from about 5½ inches to about 11 inches in length, and from about 5½ inches to about 11 inches in width to comfortably fit in a hand. The substrate can have dimensions such that the length and width differ by no more than about 2 inches. Larger substrates may be provided that can be used and then folded, either once or twice, so as to contain dirt within the inside of the fold and then the wipe can be re-used. Such larger substrates may have a length from about 5½ inches to about 13 inches and a width from about 10 inches to about 13 inches. Such substrates can be folded once or twice and still fit comfortably in the hand.

d. Cleaning Composition

Many cleaning composition components as known within the art may be suitable for use in the present pre-dosed wipes. In an embodiment, the cleaning composition is an aqueous composition, including at least 90% water by weight (e.g., 90 to 99% water). The composition may also include 0.05% to 5% by weight of a quaternary ammonium compound, and 0.1% to 5% by weight of a glycol ether solvent. For example, the quaternary ammonium compound may be included from 0.05%, from 0.1%, up to 5%, up to 4%, up to 3%, up to 2%, or up to 1% by weight of the cleaning composition. The glycol ether solvent may be included from 0.1%, from 0.25%, up to 5%, up to 4%, up to 3%, up to 2%, or up to 1% by weight of the cleaning composition. Other solvents, surfactants, and various other adjuvants often included in cleaning compositions may optionally be present. While some embodiments may include lower alcohol solvents (e.g., $C_1$-$C_4$ alcohols), the amount of such volatile solvents may be limited, e.g., to less than 10%, less than 5%, less than 3%, less than 2%, or less than 1% by weight. In some embodiments, the composition may be free of, or substantially free of, such lower alcohol or other highly volatile solvents.

Quaternary ammonium compounds have broad spectrum antimicrobial properties. A variety of different quaternary ammonium compounds can be used in the cleaning composition. Non-limiting examples of quaternary ammonium compounds are typically halides (e.g., a chloride) of alkyldimethylbenzylammonium, alkyldimethylethylbenzylammonium, alkyldimethylammonium, or the like. The alkyl groups of such quaternary ammonium compounds may typically range from $C_{12}$ to $C_{18}$. Quaternary ammonium compounds are described in more detail in U.S. Pat. No. 6,825,158, incorporated by reference herein, and will already be familiar to those of skill in the art.

The cleaning composition may include a glycol ether solvent. Exemplary glycol ether solvents include, but are not limited to, ethylene glycol monopropyl ether, ethylene glycol monobutyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, acetate and/or propionate esters of glycol ethers.

Those of skill in the art will appreciate that any among a wide variety of surfactants (e.g., anionic, cationic, non-ionic, zwitterionic, and/or amphoteric) may be included in the cleaning composition, as desired. Where included, a surfactant may be present from 0.05%, from 0.1%, up to 10%, up to 5%, up to 4%, up to 3%, up to 2%, or up to 1% by weight of the cleaning composition. Listings of exemplary surfactants are included within various of the patents and other publications already incorporated herein.

e. Stiffness and Strength Characteristics

Figure 3A:
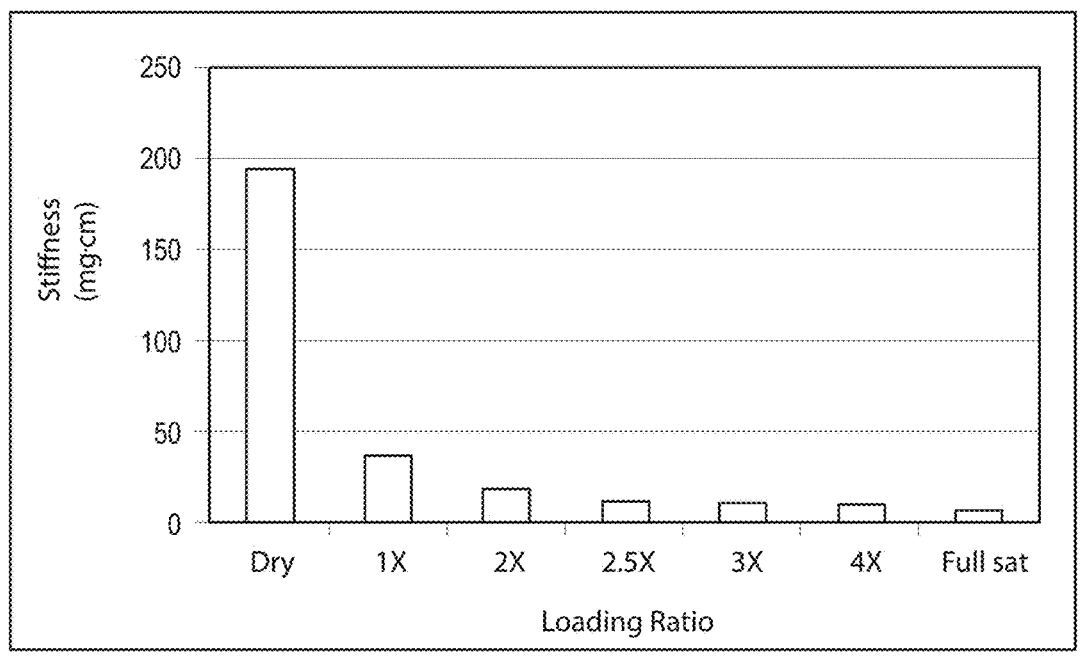
FIG. 3A illustrates stiffness values for an exemplary pulp substrate at various loading ratios.
Figure 3B:
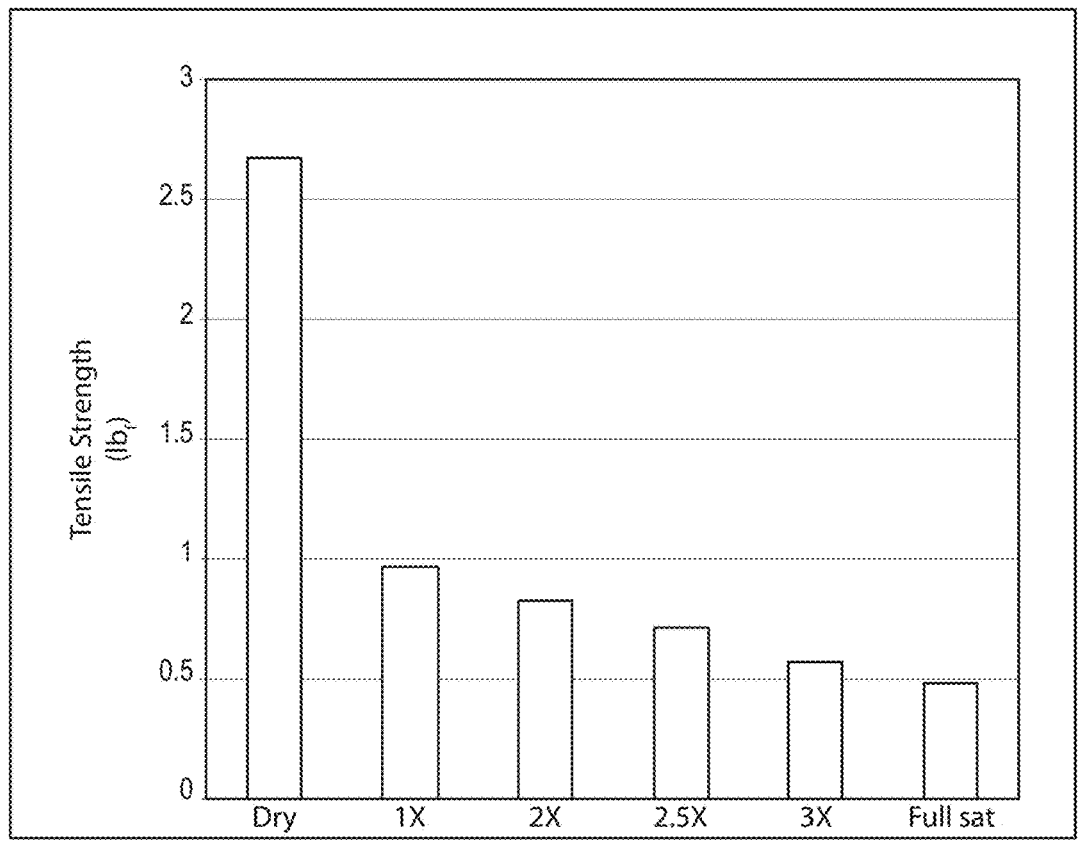
FIG. 3B illustrates tensile strength for the same exemplary pulp substrate as in FIG. 3A.

In an embodiment, the present wipe substrates may include particular stiffness characteristics, tensile strength characteristics, and/or density of pulp fiber characteristics within the substrate. The pulp substrates may exhibit a dry stiffness value that is significantly greater than the stiffness value for the pulp substrate when wetted at a given loading ratio. By way of example, FIG. 3A illustrates stiffness values (in mg·cm) for an exemplary pulp substrate both dry and loaded at various loading ratios. FIG. 3B illustrates tensile strength (in $lb_f$), as measured in the machine direction ("MD") for the same pulp substrate, again in a dry condition and at various loading ratios.

With synthetic substrates, tensile strength and stiffness values may not change dramatically as the substrate goes from wet to dry, but may remain substantially constant whether wetted or dry. For example, a substrate formed of 100% synthetic fibers may have a stiffness of about 63 mg·cm when dry, which decreases to about 40 mg·cm when wet. In a similar manner, the MD tensile strength of a 100% synthetic substrate is about 22 $lb_f$ when dry, and 16 $lb_f$ when wet. While there is a decrease in both property values, such a decrease is minor compared to what occurs upon wetting a substrate in which all or substantially all fibers therein are pulp fibers. For example, a pulp substrate may have a stiffness of about 200 mg·cm when dry, which decreases to about 48 mg·cm when wet (depending on loading ratio). In a similar manner, tensile strength is about 2.7 lbf when dry, and about 0.85 lbf when wet (depending on loading ratio).

By way of further explanation, stiffness may decrease by over 50%, over 60%, or over 70% upon wetting, with the present substrates. MD tensile strength may decrease by at least 40%, at least 50%, at least 60%, or at least 65% upon wetting, with the present substrates. By comparison, the decreases seen with synthetic, and even blended substrates, are not in the same category. For example, a typical synthetic substrate may show a stiffness decrease of less than 40%, and a MD tensile strength decrease of less than 30%. A blended substrate (e.g., 60% pulp fibers, 40% synthetic fibers) may show a stiffness decrease of less than 20%, and a MD tensile strength decrease of no more than 35%.

In addition, the actual values are quite different. For example, dry stiffness for the present pulp substrates may be greater than 100 mg·cm, such as from 150 mg·cm to 300 mg·cm. Such is far higher than the stiffness of dry synthetic and blended substrates (e.g., 63 mg·cm and 75 mg·cm, respectively). Wet stiffness for the present pulp substrates may be less than 70 mg·cm, or from 30 mg·cm to 60 mg·cm (e.g., at typical loading ratios described herein). The wet stiffness may actually be similar to the stiffness of wet synthetic and blended substrates (e.g., 40 mg·cm and 61 mg·cm, respectively). Dry tensile strength for the present pulp substrates may be less than 10 $lb_f$, such as from 1 $lb_f$ to 5 $lb_f$. Such is significantly lower than the tensile strength of dry synthetic and blended substrates (e.g., 22 $lb_f$ and 6 $lb_f$, respectively). Wet tensile strength for the present pulp substrates may be less than 2 $lb_f$, or less than 1 $lb_f$ (such as from 1 $lb_f$ to 2 $lb_f$, or from 0.5 $lb_f$ to 1 $lb_f$). Such is far lower than the tensile strength of wet synthetic and blended substrates (e.g., 16 $lb_f$ and 3.6 $lb_f$, respectively).

The present pulp substrates may be provided with a relatively high density of pulp fibers (e.g., at least 70,000 per $in^2$), and the substrate fibers may be made up principally, or even entirely of pulp fibers, rather than synthetic fibers. In addition to fibers present in the substrate, a small fraction of the substrate could also comprise an adhesive, as described herein, if desired. Even with such an adhesive or other components present, the substrate may comprise at least 70%, at least 75%, at least 80%, at least 85%, at least 90%, at least 95%, at least 97%, at least 98%, or at least 99% pulp fibers.

Such pulp fibers derive their stiffness and tensile strength from hydrogen bonding between the fibers, such that hydrogen bonded fibers participate as strength bearing elements of the substrate. In an embodiment, the substrate may be loaded with the cleaning composition at a loading ratio such that at least 20% of the pulp fibers maintain hydrogen bonding between one another. No more than 80%, no more than 70%, no more than 60%, or no more than 50% of the pulp fibers may maintain hydrogen bonding between one another. Measurement of such hydrogen bonding characteristics may be determined by simply measuring tensile strength (e.g., MD, TD, or an average) of the substrate in a dry condition, as compared to the loaded condition.

If tensile strength or stiffness is too high, the wipe becomes difficult to bunch up, and if the tensile strength is too low, the wipe feels too flimsy in the hand. Optimal hand feel may be provided with pulp substrates as described herein, at loading ratios ranging from 1:1 to 4:1, 1:1 to 3.75:1, from 2:1 to 3.75:1, from 2:1 to 3:1, or from 2.5:1 to 3:1. At the preferred loading ratios the wipe exhibits excellent flexibility for bunching in the hand of the user, but is not so weak as to easily tear or be frustrating during use.

The substrate may have a dry stiffness of at least 100 mg·cm, at least 125 mg·cm, at least 150 mg·cm, from 150 mg·cm to 200 mg·cm, or from 175 mg·cm to 200 mg·cm. Upon wetting the stiffness may be no more than 75 mg·cm, no more than 50 mg·cm, at least 5 mg·cm, at least 10 mg·cm, or from 10 mg·cm to 30 mg·cm. Such values may be for whatever loading ratio the substrate is loaded at (e.g., at least a 1:1 loading ratio, such as 1:1, 2:1, 2.5:1, 3:1 or 4:1).

The substrate may have a dry tensile strength of at least 1.5 $lb_f$, at least 2 $lb_f$, at least 2.5 $lb_f$, e.g., from 2 $lb_f$ to 3 $lb_f$. Upon wetting, the tensile strength decreases, e.g., to a value that may be no more than 1.25 $lb_f$, no more than 1 $lb_f$, at least 0.25 $lb_f$, at least 0.3 $lb_f$, at least 0.4 $lb_f$, at least 0.5 $lb_f$, or from 0.5 $lb_f$ to 1 $lb_f$. Such values may be for whatever loading ratio the substrate is loaded at (e.g., at least a 1:1 loading ratio, such as 1:1, 2:1, 2.5:1, 3:1, or the like).

The weight basis of the substrate may be no more than 100 $g/cm^2$, no more than 75 $g/cm^2$, no more than 60 $g/cm^2$, at least 10 $g/cm^2$, at least 20 $g/cm^2$, at least 25 $g/cm^2$, at least 30 $g/cm^2$, from 30 $g/cm^2$ to 60 $g/cm^2$, from 35 $g/cm^2$ to 55 $g/cm^2$, or from 40 $g/cm^2$ to 50 $g/cm^2$. Units of $g/cm^2$ are of course also routinely expressed as gsm.

Table 1A below shows numbers of pulp fibers within exemplary pulp substrates as compared to synthetic substrates and blended substrates that include both pulp fibers and synthetic fibers. Numbers of pulp fibers within a substrate may be determined by various methods. For example, one may count the fibers within a given area or volume of a SEM image, and then by extrapolating such number to the wipe as a whole (or per $in^2$). Another method (which was used by Applicants to determine the values reported herein) may include making a calculation as described below.

The following formula was used to estimate the number of fibers in the substrates described herein. Number of fibers=(Mass of substrate in grams)/(Mass of fiber in grams). For blended substrates the mass was determined as a percentage of the blend contribution to the final mass.

Because the wood pulp fibers are ribbon shaped, fiber length (l), breadth (b) and width (w) were measured using an SEM microscope. The volume of the wood pulp fiber was calculated using the formula Volume=l·b·h ($cm^3$). The density was obtained from the literature, in $g/cm^3$. Such density values for various varietals typically range from 20 $lb/ft^3$ (0.32 $g/cm^3$) to 30 $lb/ft^3$ (0.49 $g/cm^3$). The mass in grams was calculated using the formula mass (g)=Density ($g/cm^3$)×volume ($cm^3$).

Because synthetic fibers of interest in this application are generally cylindrical, the diameter of the cylinder was measured using an SEM microscope. The volume of the synthetic fiber was calculated using the formula Volume=$\pi \cdot R^2 \cdot L$ (where L=length of the fiber, and R=fiber radius). The density was obtained from the literature, in $g/cm^3$. The mass in grams was calculated using the formula mass (g)=Density ($g/cm^3$)×volume ($cm^3$).

TABLE 1A

| Sample (7 in × 8 in) | Basis Weight (gsm) | No. of Pulp Fibers | No. of Synthetic Fibers | No of Pulp Fibers per $in^2$ |
|---|---|---|---|---|
| High Texture 100% Pulp | 41 | 4,135,065 | 0 | 73,840 |
| Low Texture 100% Pulp | 48 | 5,168,831 | 0 | 92,300 |
| Blend of 60% Pulp/40% Synthetic - No Texture | 52 | 3,116,883 | 38,647 | 55,659 |
| 100% Synthetic - No Texture | 52 | 0 | 248,447 | 0 |

Table 1B shows percentage and number of pulp fibers that are participating as strength bearing elements for the two 100% pulp samples of Table 1A, at various loading ratios, as well as the number in each substrate (High texture versus Low texture) on a per square inch basis.

TABLE 1B

| Loading Ratio | % Pulp Fibers Participating Based on Tensile Strength | No. of Pulp Fibers Participating (High Localized Texture Substrate) | No. of Pulp Fibers Participating (Low Texture Substrate) | No of Pulp Fibers Participating per $in^2$ | |
|---|---|---|---|---|---|
| | | | | High T | Low T |
| 0 (Dry) | 100 | 4,135,065 | 5,168,831 | 73,840 | 92,300 |

TABLE 1B-continued

| Loading Ratio | % Pulp Fibers Participating Based on Tensile Strength | No. of Pulp Fibers Participating (High Localized Texture Substrate) | No. of Pulp Fibers Participating (Low Texture Substrate) | No of Pulp Fibers Participating per in² | |
|---|---|---|---|---|---|
| | | | | High T | Low T |
| 1:1 | 36 | 1,488,623 | 1,860,779 | 26,582 | 33,228 |
| 2:1 | 30 | 1,240,519 | 1,550,649 | 22,152 | 27,690 |
| 2.5:1 | 26 | 1,075,117 | 1,343,896 | 19,200 | 24,000 |
| 3:1 | 21 | 868,364 | 1,085,455 | 16,042 | 19,383 |
| Saturation | 18 | 744,312 | 930,390 | 13,291 | 16,614 |

It will be apparent that the substrates may thus rely on hydrogen bonding for strength, rather than stronger forces that may be present in synthetic fiber based substrates (e.g., covalent bonds present in cross-linked molecules or materials). Such hydrogen bonds significantly decrease in strength (or the number of such hydrogen bonds decreases) when water is added, such as would be present in the cleaning compositions contemplated herein.

The percentage of pulp fibers that maintain hydrogen bonding with one another may be at least 20%, e.g., from 20% to 30% of the pulp fibers, or 25% to 30%, such as 20%, 21%, 22%, 23%, 24%, 25%, 26%, 27%, 28%, 29%, or 30%. Similarly, the density of pulp fibers participating in hydrogen bonding may be at least 15,000 per in², such as 15,000 per in² to 35,000 per in², from 15,000 per in² to 30,000 per in², or from 15,000 per in² to 25,000 per in², such as 15,000 per in², 16,000 per in², 17,000 per in², 18,000 per in², 19,000 per in², 20,000 per in², 21,000 per in², 22,000 per in², 23,000 per in², 24,000 per in², 25,000 per in², 26,000 per in², 27,000 per in², 28,000 per in², 29,000 per in², or 30,000 per in².

f. Wet Bulk Factor

Wet bulk factor is defined as the ratio of the profile height of the dry substrate relative to the profile height of the substrate following wetting and redrying. In other words, the wet bulk factor is a measure of the degree of compression (or expansion) exhibited by the particular substrate following wetting, and subsequent redrying. Applicant has observed that synthetic substrates, and even substrates that include a blend of synthetic fibers and pulp fibers with a large fraction of synthetic fibers in the blend, tend to exhibit relatively low wet bulk factor values. Substrates according to the present invention may include relatively high wet bulk factor values, e.g., such as at least 1.5, at least 1.55, at least 1.6, from 1.5 to 2, or from 1.6 to 2. Examples of such may include 1.5, 1.55, 1.6, 1.65, 1.7, 1.75, 1.8 1.85, 1.9, 1.95, or 2.0.

As explained above, the substrate has both a dry profile height (after wetting and redrying) and a wet profile height. Furthermore, as described herein, the substrate preferably has highly localized texture, so that the bulk thickness of the substrate is far less than the profile heights (i.e., because of the textured characteristics). For example, when measured with calipers, the substrate may have a thickness of only about 0.2 mm (200 μm), although when measured not on a bulk scale, but using a profile-o-meter, e.g., which can be used to chart profile height for any given distance across the substrate, the dry profile height (before wetting) may be from 1000 μm to 1400 μm, or 1000 μm to 1200 μm. The profile height after wetting and redrying (i.e., wet profile height) may be 400 μm to 800 μm, or 500 μm to 700 μm. In other words, after wetting and redrying, the profile is compressed compared to what it was prior to wetting in the first place. Any profile-o-meter (e.g., such as those commercially available) may be used for such measurements.

Figure 1B:
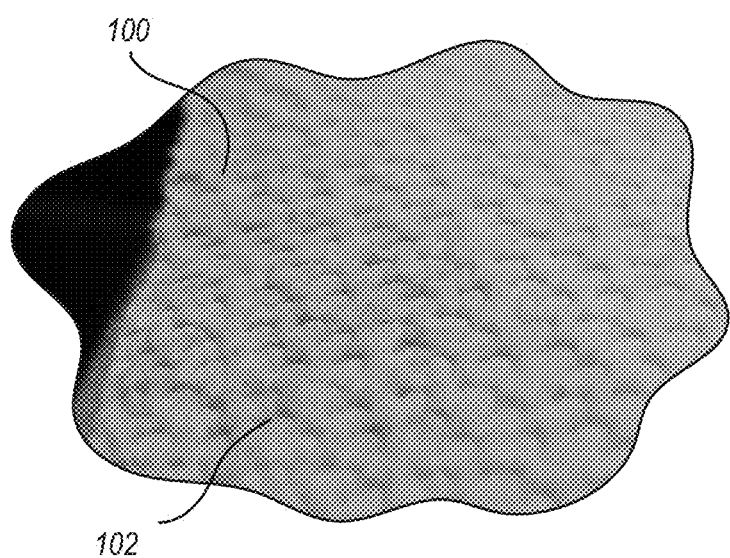

The "rough" characteristics of the profile are apparent from FIGS. 1A and 1B, where the localized regions of higher pulp fiber density are apparent, resulting in not only regions of higher fiber density, but in a configuration where these same regions are also raised so as to protrude relative to the surrounding portions of the substrate. The reverse of the substrate (see FIG. 1B) may exhibit an inverse pattern, so that on the opposite face, those areas that are "raised" (in FIG. 1A) are "recessed" on the opposite face (in FIG. 1B). Similarly, those regions that on the first face surround the raised region (and are thus the lowest points of the substrate) are raised on the opposite face, where the surrounding raised regions surround the recessed region, on the opposite face.

Table 2 shows exemplary wet bulk factor characteristics for various tested substrates.

TABLE 2

| Substrate | Wet Bulk Factor (Dry/Wet Profile Height Ratio) |
|---|---|
| 100% Synthetic Substrate - 1 | 1.19 |
| 100% Synthetic Substrate - 2 | 1.14 |
| 100% Synthetic Substrate - 3 | 1.00 |
| 60/40 Blend - 1 | 0.84 |
| 60/40 Blend - 2 | 0.91 |
| 60/40 Blend - 3 | 0.93 |
| 60/40 Blend - 4 | 1.00 |
| 60/40 Blend - 5 | 1.08 |
| 60/40 Blend - 6 | 1.26 |
| 100% Pulp substrate with light overall texture | 1.30 |
| 100% Pulp substrate with no texture | 1.45 |
| 100% Pulp substrate with high localized texture & low LR | 1.71 |
| 100% Pulp substrate with high localized texture | 1.84 |

Both synthetic substrate-1 and synthetic substrate-2 were different wipe products including scrubbing zones. Synthetic substrate-3 was a synthetic wipe product without any texture. Each of the blended wipes include a 60/40 pulp/synthetic fiber blend. Blend-1 included a high localized texture, Blend-2 included the same texture, loaded at a low LR (LR=2.5:1). Blend-3 was another wipe with high localized texture, Blend-4 had no texture, Blend-5 had light texture, and Blend-6 also had no texture. The results show that even with different substrate textures and other characteristics, the synthetic and blended substrates consistently provide significantly lower wet bulk factor values than the pulp substrates.

g. Substrate Pore Size Distribution

The substrate may exhibit particular pore size distribution characteristics. For example, the pulp substrates may be such that most pores have a size greater than 200 μm, such as 300 μm to 400 μm, rather than smaller (e.g., less than 200 μm) pores. Such larger pore sizes may account for a majority of the pores, or at least more of the pores than any smaller pore size range. In a preferred embodiment, the inventive substrate has less than 60%, more preferred less than 50% or less than 40% of total percentage of pores for the substrate within the pore size range of 0-200 μm. In a preferred embodiment, the inventive substrate is such that more than 30%, more than 40%, more than 50%, or more than 60% of total percentage of pores for the substrate are within the pore size range of 300-400 μm. Such determination may be made on a numerical, rather than a volumetric basis. Synthetic substrates used in the field typically include far more smaller sized pores, e.g., where most pores have a size of less than 200 μm.

Table 3A below provides pore size distribution data for various substrates that were tested to determine their pore size distribution characteristics. Table 3B provides data relative to the number of pores for the same substrates as in Table 3A. Table 3C provides data on number of pores per square inch, for the various pore size ranges, for the same substrates.

TABLE 3A

| Pore Size (μm) | 0-200 μm | 200-300 μm | 300-400 μm | Density (g/cm³) |
|---|---|---|---|---|
| 100% Synthetic Substrate | 87% | 8% | 4% | 0.12 |
| 60/40 Blend (w/o texture) | 87% | 13% | 0% | 0.13 |
| 60/40 Blend (w/high localized texture) | 64% | 7% | 30% | 0.1 |
| 100% Pulp substrate with light overall texture | 64% | 21% | 15% | 0.05 |
| 100% Pulp substrate with high localized texture | 32% | 7% | 61% | 0.06 |

TABLE 3B

| Pore Size (μm) | 0-200 μm | 200-300 μm | 300-400 μm | Total Pores |
|---|---|---|---|---|
| 100% Synthetic Substrate | 20,010,000 | 1,840,000 | 920,000 | 23,000,000 |
| 60/40 Blend (w/o texture) | 15,660,000 | 2,340,000 | 0 | 18,000,000 |
| 60/40 Blend (w/high localized texture) | 12,160,000 | 1,330,000 | 5,700,000 | 19,000,000 |
| 100% Pulp substrate with light overall texture | 10,240,000 | 3,360,000 | 2,400,000 | 16,000,000 |
| 100% Pulp substrate with high localized texture | 4,480,000 | 980,000 | 8,540,000 | 14,000,000 |

TABLE 3C

| Pore Size (μm) | 0-200 μm (per in²) | 200-300 μm (per in²) | 300-400 μm (per in²) | Total Pores (per in²) |
|---|---|---|---|---|
| 100% Synthetic Substrate | 357,000 | 32,900 | 16,400 | 411,000 |
| 60/40 Blend (w/o texture) | 280,000 | 41,800 | 0 | 321,000 |
| 60/40 Blend (w/high localized texture) | 217,000 | 23,800 | 101,800 | 339,000 |
| 100% Pulp substrate with light overall texture | 183,000 | 60,000 | 42,900 | 286,000 |
| 100% Pulp substrate with high localized texture | 80,000 | 17,500 | 153,000 | 250,000 |

Figure 1C:
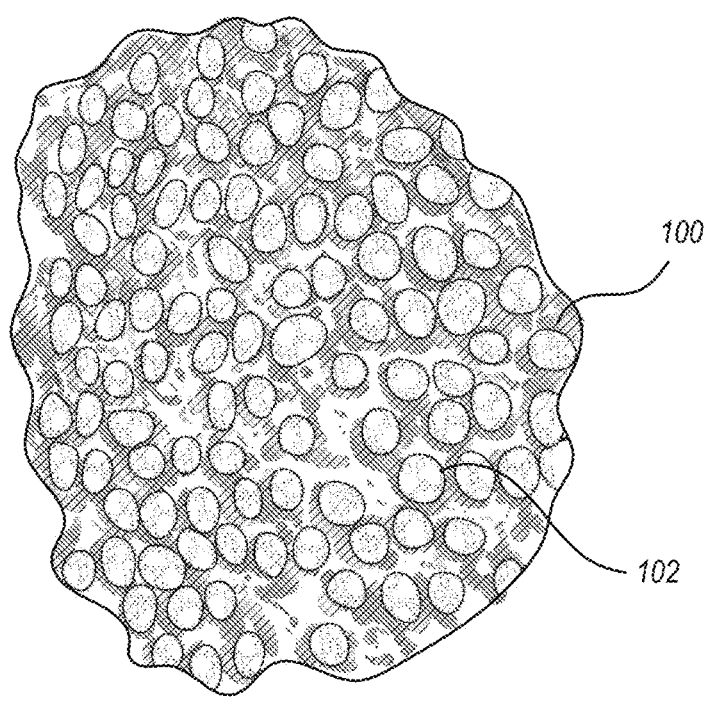
FIG. 1C is an illustration representing the wipe and substrate seen in FIGS. 1A-1B.

As shown, both synthetic, and even blended substrates (e.g., 40% synthetic, 60% pulp) are similar to one another in their pore distribution characteristics, where all such tested substrates are characterized by small pores, sized 200 μm or less. A substrate with a high localized texture will have more variation in the z-direction fibers so that the thickness of the substrate will vary along the surface that has a high localized texture. The texture may take on a variety of different shapes, by way of example and not limitation, the texture of may be quilted, bumpy, rough, tufted, etc. High localized texture is the opposite of a flat substrate where there is little or no perceived texture, or such z-dimension variation. Light overall texture falls between the high localized texture and the substrates without any texture. Textures can be quantified using imaging techniques, caliper measurements, and/or profile-o-meter measurements, as described herein. Addition of texturing to the blended substrate shows an increase in the fraction of larger pore sizes, but the blended substrate with high localized texture is still characterized by the small pore size, of 200 μm or less. The data further show that even 100% pulp substrates, if they do not include the high localized texture as seen in FIGS. 1A-1C, also do not change the predominance of the small pore sizes. Specifically, the 100% pulp substrate with light overall texture is still largely made up of pores sized 200 μm or less. The 100% pulp substrate with high localized texture includes significantly different pore distribution characteristics, where most pores are larger, in the size range of 300-400 μm. There are still a significant number of smaller pores, sized 200 μm or less, but this is no longer the predominant size.

This particular substrate has been shown by Applicant to exhibit particular advantageous characteristics relative to hand feel, retention of cleaning composition, and release profile characteristics, as well as desirable microefficacy characteristics. The larger pore size is believed to play a role in at least some of these observed desirable characteristics. The combination of the pore size distribution and the 100% pulp fibers work together to create a desirable release profile for the lotion in the inventive examples. For example, because of the increased presence of the larger pore sizes, the cleaning composition is retained more readily within the matrix provided by the substrate, so as to be released in a more uniformly dosed profile during wiping. Thus, the wipe exhibits less of a tendency to "dump" the composition rapidly, but instead delivers a more uniformly dosed volume of cleaning composition throughout its use. Such improved uniformity in dosing also aids in ensuring consistent deposition of desired lotion ingredients to the entire area of the target surface being cleaned by a real world user.

Furthermore, the increased size of the pores decreases the probability that any given molecule of the quaternary ammonium compound within the cleaning composition will be attracted and bound to an anionic binding site associated with the pulp substrate, given the increased volume provided within larger sized pores. In other words, the larger sized pores may decrease the density of such anionic binding sites within the substrate, which increases the percentage of the quaternary ammonium compound that is released to a target surface during wiping. As noted herein, the wipe may be configured to release at least 20% (e.g., 30% to 50%) of the quaternary ammonium compound to the target surface upon squeezing, wiping, or other use.

Table 3A further provides density data for the tested substrates. The pulp substrates may also exhibit lower density as compared to existing substrates used in existing wipes. For example, density (e.g., dry density) of the pulp substrate may be less than 0.1 g/cm$^3$ (e.g., from 0.03 g/cm$^3$ to 0.08 g/cm$^3$, or from 0.04 g/cm$^3$ to 0.07 g/cm$^3$). The measured decreased density may also correspond to the presence of larger pore sizes, as also shown in Tables 3A-3B.

Table 3B further shows how the pulp substrate with high localized texture includes less overall pores, with larger pore sizes (as shown in Table 3A), as compared to the other tested substrates. The number of pores may be estimated by generating pore volume distribution data using a PMI Liquid Extrusion Porosimeter, or the like. Such porosimeters may calculate the number of pores based on an assumption that all pores are cylindrical, and by using the Young-LaPlace equation. It will be appreciated that other tools or calculations may also be suitable for estimating or calculating the number of pores.

h. Other Lotion Retention Characteristics

Applicant has observed other unique and advantageous characteristics with the particular substrate selection, in terms of how a cleaning composition loaded into the substrates is released during use. As noted above, many existing wipes have a tendency to "dump" their cleaning composition quickly, rather providing a relatively uniform dosing of the cleaning composition during wiping, which would increase mileage of the wipe. For example, when squeezing or centrifuging a typical synthetic or blended wipe under controlled conditions, more than 50% of the cleaning composition is released, leaving only a small fraction retained within the wipe. Such compression (e.g., using a conventional lemon press, or a centrifuge) is indicative of the tendency of conventional wipes to "dump" their composition quickly during wiping or other normal use. The present wipes include a far higher fraction of pulp, and preferably a localized, high degree of texture. Significantly more of the cleaning composition is retained under compression test conditions. For example, when tested in the same way (e.g., compressed in a lemon press or centrifuged) the wipe may exhibit retention of at least 50% of the cleaning composition. This ability to better retain the composition when the wipe is compressed advantageously increases the mileage of the wipe, allowing greater cleaning, disinfection, or sanitization of a given surface area with a given wipe.

Figure 4A:
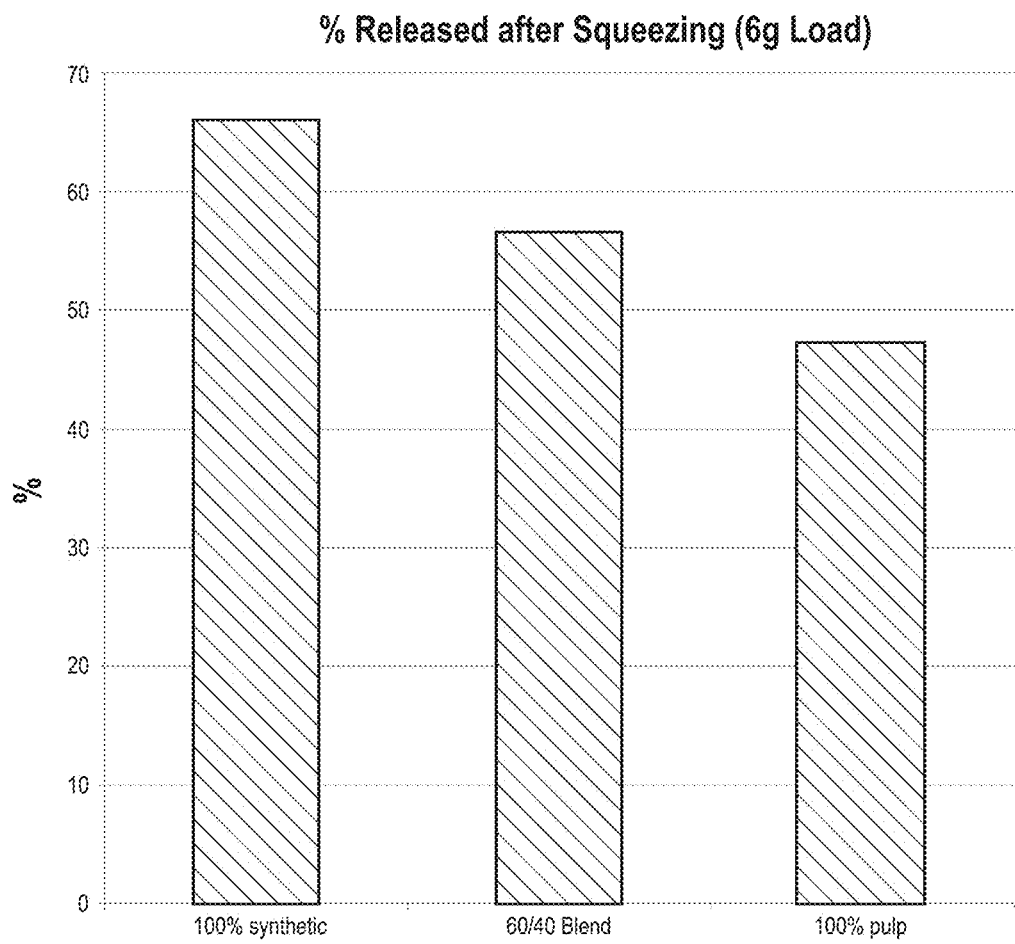
FIG. 4A shows test results for retention of cleaning composition loaded within wipes based on various tested substrates, loaded at less than saturation.

FIG. 4A shows test results for such retention versus release for synthetic, blended, and 100% pulp substrates, where the substrates are loaded with 6 grams of cleaning composition. When loaded with 6 g of cleaning composition, each of the tested substrates had a loading ratio of 5:1. Each tested substrate measured 7 inches×7 inches.

Figure 4B:
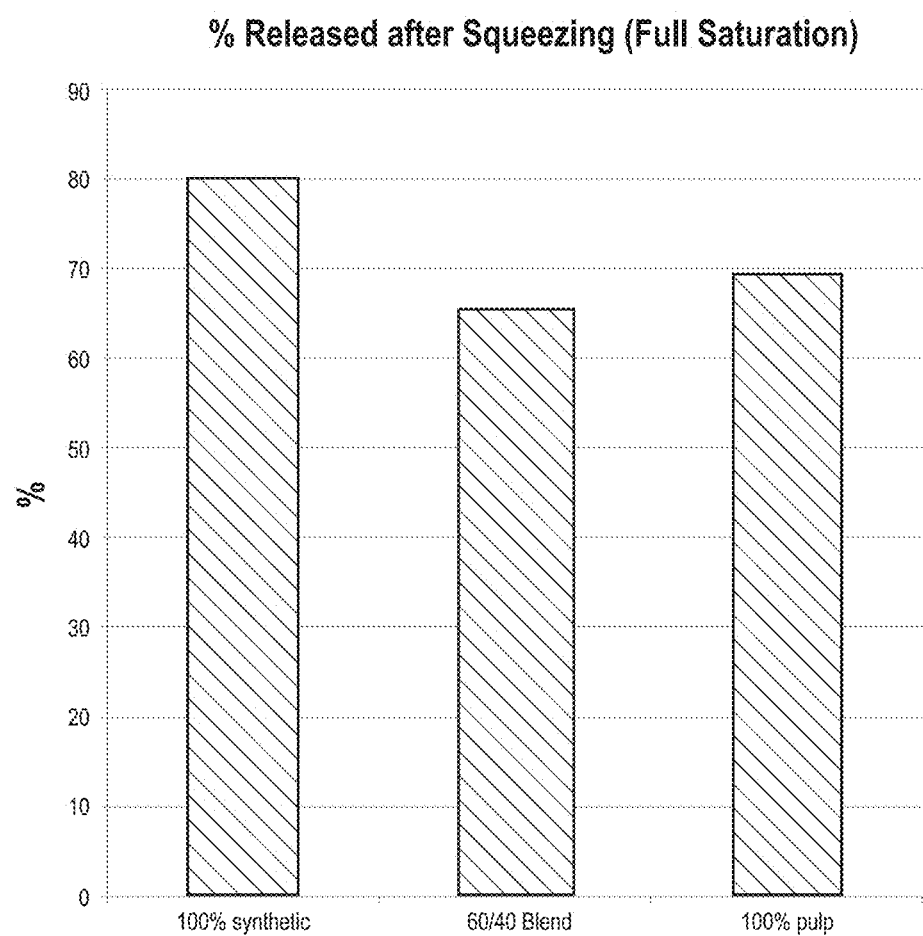
FIG. 4B shows results for the same substrates as FIG. 4A, loaded to full saturation.

FIG. 4B shows results for the same substrates loaded to full saturation. As noted herein, loading to full saturation is not preferred for various reasons. Full saturation for the synthetic substrate was at loading ratio of 7:1, full saturation for the pulp substrate was at a loading ratio of 7:1, and full saturation for the 60/40 blended substrate was at a loading ratio of 6:1. For FIGS. 4A and 4B, the wipes were simply compressed using a lemon press. Other methods of simply squeezing (or centrifuging) the composition from the wipe could similarly be used, and would provide similar results.

Figure 4C:
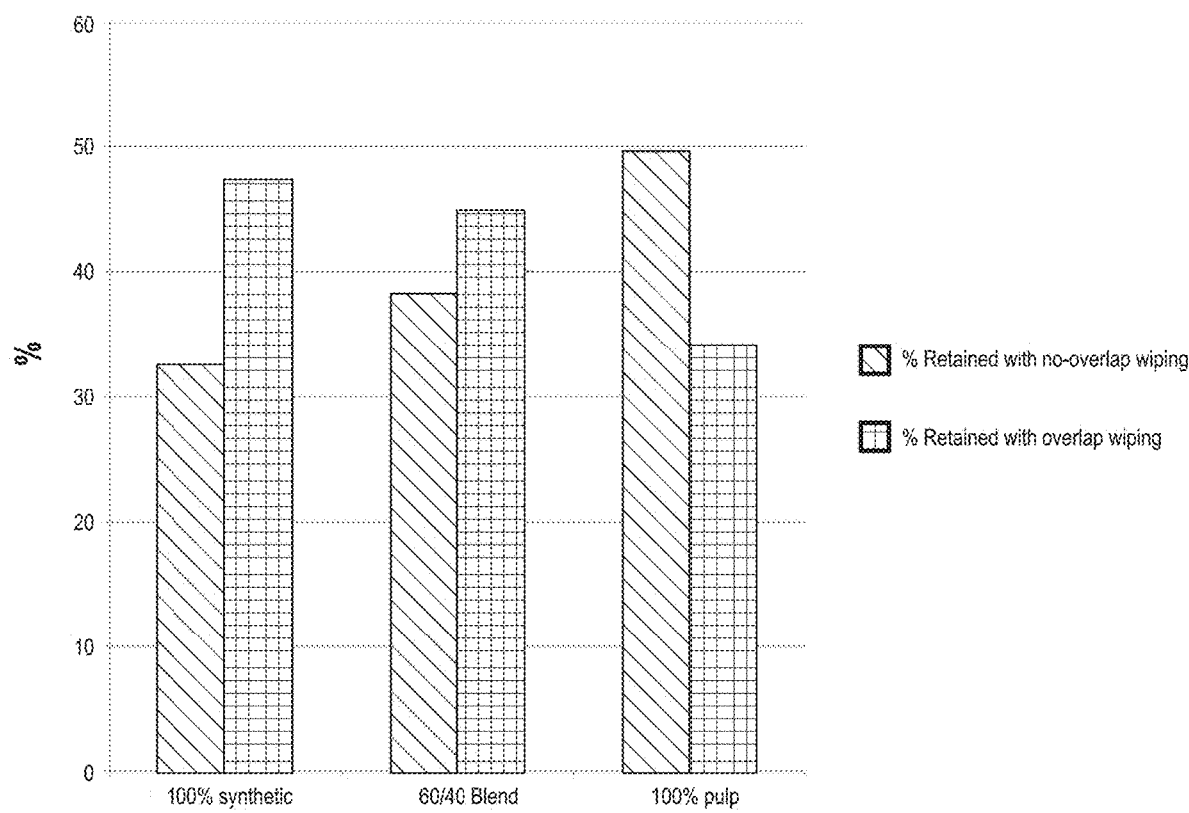
FIG. 4C shows retention of cleaning composition in the wipe for the same substrates as FIG. 4A, tested according to two different wiping regimes.

FIG. 4C shows retention of cleaning composition in the wipe for the same substrates, but tested by a different methodology, intended to simulate retention and release characteristics during wiping. Two different wiping regimes (with and without overlap) were tested. Specifically, according to one regime, the wipe was wiped across a target surface being treated, with no overlap in wiping. According to the other regime, the wipe was wiped across the target surface, and there was overlap (e.g., a back and forth wiping regime). The wiping regime including overlap may closely approximate actual usage conditions of many consumers, as many consumers will often wipe a surface in a manner that they wipe again over the same portion of the surface that has already been wiped by the cleaning wipe.

The results shown in FIG. 4C show that the 100% pulp substrate retains the most cleaning composition under the no overlap wiping regime. Specifically, the pulp substrate retains approximately 50% of the cleaning composition, as compared to retention of less than 40%, and less than 35% for the blended, and synthetic substrates, respectively. Such increased retention of the cleaning composition results in increased useable life (i.e., increased mileage) for the 100% pulp wipe, as compared to the others.

The results shown in FIG. 4C also show that under the wiping regime with overlap, the 100% pulp substrate actually retains the least amount of cleaning composition. Specifically the pulp substrate retains about 35%, while the blended and synthetic wipes retain about 45% and about 48%, respectively. The results under such a wiping regime show that the pulp substrates have the greatest usefulness of the 3 tested substrates, in that more of the cleaning composition is actually being delivered, where it is needed for sanitization or disinfection. A possible explanation of the observed phenomenon is that the synthetic and blended substrates tend to quickly "dump" their composition from the wipe onto the surface being treated. As the wipe is wiped over this soaked area again (during the overlap portion of the wiping regime), the wipe actually reabsorbs a portion of the cleaning composition, increasing the percentage it then retains. Such results are further evidence of the lack of controlled release and delivery of cleaning compositions from existing synthetic and blended substrates, which tend to "dump", and then to reabsorb, if overlap wiped.

The 100% pulp substrates on the other hand tend to deliver a more uniform dosage of the cleaning composition across all portions of the surface area being treated, no matter the wiping regime. Such uniformity of dosage increases the reliability and effectiveness of sanitization and/or disinfection over the entire treated surface. For example, while areas in which the composition is "dumped" by a synthetic or blended wipe may exhibit good sanitization and/or disinfection (if not overlap wiped) because of the excess delivery of cleaning composition to those areas, other regions of the treated surface area may not receive sufficient cleaning composition for desired efficacy. The cleaning results may thus be "spotty" as some areas will not be uniformly dosed with the cleaning composition. The pulp substrates as described herein will exhibit more uniform dosing of the cleaning composition over the surface area being treated, so as to provide sufficient cleaning composition over all regions of the surface area, providing more effective sanitization or disinfection over the entire treated surface.

Another characteristic apparent from an analysis of FIG. 4C is that the pulp substrate exhibits lower retention for an overlap application method as compared to the retention when applied with an overlap wiping method, which is exactly opposite that seen with synthetic and blended substrates (which exhibit higher retention with overlap, as compared to without). This unique characteristic of the pulp substrates as compared to the blended and synthetic substrates is believed to be indicative of the blended and synthetic wipe's tendency to "dump", whereas the pulp substrate does not exhibit this characteristic, but delivers a more uniform, dosed quantity of the lotion throughout the wiping motion, no matter if the wiping is in an overlap or no overlap regime.

Another characteristic related to absorbency that has been observed by Applicant is that existing pre-loaded wipe products are not particularly good at absorbing light spills. For example, the synthetic or blended substrates are typically loaded at relatively high loading ratios in order to ensure sufficient antimicrobial agent is delivered to the surface being treated, and also in an attempt to partially compensate for the tendency of the composition to be "dumped" when the user first compresses the wipe, either by squeezing or wiping a surface. The present wipes including a pulp substrate, on the other hand exhibit far greater absorbency, which allows such wipes to be used to clean up (i.e., absorb) light spills from the target surface, while at the same time delivering an antimicrobial agent to the target surface. Stated another way, because the present wipes are not loaded to saturation, they have the ability to better absorb light spills during use. Blended or synthetic wipes are loaded much closer to saturation in order to provide desired microefficacy, so that they do not exhibit this advantage. Such a combination of features is simply not possible with current wipes based on synthetic and blended substrates. It was unexpected that the present wipes are able to achieve desired microefficacy results at relatively low loading ratios, while at the same time providing absorptive capacity for absorbing liquid spills from the same target surface to which the cleaning composition is being delivered.

i. MABDF

Many of the characteristics described herein relative to the pulp substrates may be represented in an empirical measurement, defined as mileage absorbency/desorbency factor (MABDF), where MABDF is defined as:

$$\frac{(R + P + S)}{(\rho + TS)}$$

where R is the percentage of composition retained upon squeezing, P is the percentage of pulp in the substrate, S is the stiffness of the wipe (in mg·cm), $\rho$ is the density of the wipe (in gm/cm$^3$), and TS is the tensile strength of the substrate (in lb$_f$). MABDF empirical values may be determined for both wet and dry conditions, as values such as stiffness and tensile strength may change depending on whether the wipe is wet or dry. An average MABDF may also be determined, as an average of the wet and dry values.

The MABDF empirical value is indicative of how well the substrate retains the cleaning composition so as to deliver it in a relatively uniformly dosed way, over the useful life of the wipe, as opposed to "dumping" the composition very quickly, well before the durability characteristics of the wipe have been expended. MABDF may also be indicative of other advantageous characteristics as described herein.

Such MABDF values for the present wipes may be significantly higher than for existing commercially available wipes, which are based on synthetic or blended substrates. Tables 4A-4B below show various values that go into the MABDF determination, as well as MABDF values for various tested wipes. Table 4C shows average MABDF values.

TABLE 4A

Dry MABDF

|  | 100% Pulp substrate - 1 | 100% Pulp substrate - 2 | 60/40 Blend | 100% Synthetic Substrate |
|---|---|---|---|---|
| Wet Density (g/cm$^3$) | 0.05 | 0.07 | 0.13 | 0.12 |
| Saturation Capacity (g) | 14 | 8 | 8 | 11 |
| Percent Retained | 31 | 41 | 35 | 20 |
| Percent Released | 69 | 59 | 65 | 80 |
| MD Dry Tensile Strength (lb$_f$) | 2.68 | 2.68 | 5.58 | 21.93 |
| Percentage Pulp | 99.5 | 99.5 | 60 | 0 |
| Dry Stiffness (mg · cm) | 200 | 200 | 75 | 63 |
| MABDF - Dry | 126 | 127 | 31 | 4 |

TABLE 3B

Wet MABDF

|  | 100% Pulp substrate - 2 | 100% Pulp substrate - 1 | 60/40 Blend | 100% Synthetic Substrate |
|---|---|---|---|---|
| Wet Density (g/cm$^3$) | 0.05 | 0.07 | 0.13 | 0.12 |
| Saturation Capacity (g) | 14 | 8 | 8 | 11 |
| Percent Retained | 31 | 41 | 35 | 20 |
| Percent Released | 69 | 59 | 65 | 80 |
| MD Wet Tensile Strength (lb$_f$) | 0.84 | 0.84 | 3.62 | 15.61 |
| Percentage Pulp | 99.5 | 99.5 | 60 | 0 |
| Wet Stiffness (mg · cm) | 48 | 48 | 61 | 40 |
| MABDF - Wet | 217 | 216 | 44 | 5 |

TABLE 4C

Average MABDF

|  | 100% Pulp substrate - 2 | 100% Pulp substrate - 1 | 60/40 Blend | 100% Synthetic Substrate |
|---|---|---|---|---|
| MABDF - Avg | 172 | 172 | 37 | 4 |

As seen, wet, dry, and average MABDF values may be greater than 50, at least 60, at least 70, at least 80, at least 90, or at least 100, from 80 to 400, from 80 to 300, from 100 to 300, or from 100 to 250.

j. Antimicrobial Efficacy

Various types of pulp substrates were tested for their ability to effectively deliver an antimicrobial quaternary ammonium compound to a surface during simulated cleaning. Applicant noted that the generally anionic characteristics of typical pulp substrates leads to a tendency of the substrate to bind or otherwise retain the cationic quaternary ammonium compound, even when squeezing an aqueous cleaning composition from the pulp substrate. In other words, typically, the concentration of quaternary ammonium compound in the "squeezate" (the cleaning composition as squeezed from the pre-loaded wipe) is less than the concentration of quaternary ammonium compound in the cleaning composition before it was loaded into the wipe. Since quaternary ammonium compounds are known to bind to pulp substrates, it was unexpected that the present wipes were able to release a significant enough portion of the quaternary ammonium compound to achieve disinfectancy and/or sanitization on a treated surface without the inclusion of a biocide release agent or latex binder in the substrate.

Because of this characteristic, it can be important to ensure that sufficient quaternary ammonium compound is included in the composition as loaded to ensure there is sufficient in the squeezate to provide a desired degree of antimicrobial efficacy. For example, in an embodiment, the wipes release at least 20% of the quaternary ammonium compound (i.e., quaternary ammonium compound in the squeezate as compared to the cleaning composition before loading). By way of further example, the wipes may exhibit at least a 3-log reduction in a target microbe, such as *Staphylococcus aureus*, within a given time frame (e.g., such as 5 minutes, 1 minute, 30 seconds, 10 seconds, etc.). The large pores as described herein are also believed to play a role in the observed good microefficacy results. For example, treatment composition retained in smaller sized pores may be more likely to have the quaternary ammonium compound bound to an anionic site defining such pore as compared to a larger pore, where the distance from a given quaternary ammonium compound molecule to the boundary of the pore will be greater. Such increased distance (as provided by the larger pore size) increases the fraction of quaternary ammonium compound released in the squeezate, increasing the microefficacy.

Table 5 shows the results of testing in which a cleaning composition including 0.363% of a quaternary ammonium compound was loaded into several different types of substrates. The cleaning composition was squeezed therefrom, and the squeezate was analyzed to determine the concentration of the quaternary ammonium compound therein.

TABLE 5

| Substrate | % Quat in Cleaning Composition | % Quat in Squeezate | % Quat Released |
| --- | --- | --- | --- |
| 60/40 synthetic blend with high localized texture | 0.363 | 0.160 | 44.11% |
| 100% pulp with latex binder | 0.363 | 0.235 | 64.90% |
| 100% pulp with light texture | 0.363 | 0.085 | 23.39% |
| 100% pulp with high localized texture | 0.363 | 0.161 | 44.27% |

While inclusion of a latex binder in the substrate increases the percentage of the quaternary ammonium compound (quat) being released, in an embodiment, no latex binders are added to the substrate, as such inclusion increases complexity of manufacture (and costs), and reduces the strength of the substrate when wet, which is particularly problematic. Such latex binders may be characterized as cationic biocide release agents, for purposes of the present application. In an embodiment, the present wipes are preferably free of such cationic biocide release agents, as while they may increase release of the cationic biocide, such cationic agents introduce other problems.

For example, while cationic latex may block some of the anionic binding sites of the pulp substrate so as to increase quat release, the latex decreases strength and otherwise negatively affects the hand feel characteristics of the wipe, particularly when wet. Similarly, cationic salts might be added to the composition or otherwise provided within the wipe for a similar purpose, but such salts lead to undesirable streaking and film formation characteristics associated with the wipe. Thus, in an embodiment, the wipe is free of or at least substantially free of such cationic biocide release agents. Materials that have applicability both as binders and processing aids may be used in small amounts as a processing aid for wet strength in pulp substrate processing. Examples of such materials include KYMENE, cellulose gum, sodium carboxymethylcellulose (CMC) or the like. Such materials may be present at low levels (e.g. less than 1% by weight, less than 0.5% by weight, less than 0.2% by weight, less than 0.1% by weight, less than 0.05%, or the like) in the inventive wipes, not as binders, but simply because they are commonly used in the manufacture of pulp substrate materials (e.g., as a processing aid).

Without the aid of such release agents, the wipe may release at least 20%, at least 25%, at least 30%, at least 35%, at least 40%, up to 100%, up to 90%, up to 80%, up to 70%, up to 60%, up to 50%, from 20% to 60%, or from 30% to 50% of the quaternary ammonium compound upon squeezing (e.g., use or simulated use).

From the data of Table 5, it is apparent that the high localized texture (as illustrated in FIGS. 1A-1C) and the pore size distribution characteristics associated therewith (see Tables 3A-3C) contribute significantly to the ability to improve release, as compared to other textures (e.g., no texture, or a light texture). For example, the 100% pulp substrate with light texture was only able to release about 23% of the quaternary amine, while the same 100% pulp substrate with high texture was able to release more than 44% of the quaternary amine, on a par with the blended substrate (60% pulp, 40% synthetic). Such increased release due to high texture may be associated with the pore distribution characteristics as described herein. For example, the high texture substrates were characterized by larger sized pores, which will reduce the density of anionic binding sites available in the substrate for retaining the quaternary ammonium compound. The result is that the high texture substrate characterized by larger pore sizes is able to release a significantly higher percentage of the quaternary ammonium compound, even without the use of any cationic biocide release agents.

Further testing was conducted to analyze microefficacy of the present wipes against *Staphylococcus aureus*. Two cleaning compositions were tested, as shown in Table 6 below. The percentages are for the cleaning composition prior to loading (i.e., the squeezate will have less quat).

TABLE 6

|  | Formula 1 | Formula 2 | Formula 3 |
| --- | --- | --- | --- |
| Quat % | 0.367 | 0.27 | 0.367 |
| Lower Control Limit (LCL) | 0.33 | 0.22 | 0.33 |
| Target Quat Level | 0.367 | 0.27 | 0.367 |

TABLE 6-continued

|  | Formula 1 | Formula 2 | Formula 3 |
|---|---|---|---|
| Upper Control Limit (UCL) | 0.42 | 0.32 | 0.42 |
| Nonionic Surfactant % | 0.44 | 0.3 | 0.11 |
| Na-bicarbonate % | 0.006 | 0.006 | 0 |
| Citric Acid % | 0.005 | 0.005 | 0 |
| Glycol Ether solvent % | 1.83 | 1 | 1.00 |
| IPA % | 0.45 | 0.39 | 0.45 |
| Fragrance % | 0.1 | 0.1 | 0.12 |
| Water | Balance | Balance | Balance |

Both formulas were tested using 100% pulp substrates, having a high localized texture, such as seen in FIGS. 1A-1C. Various different loading ratios and contact times were tested for disinfection and/or sanitization ability. Table 7 shows the results of such testing.

TABLE 7

| Sample | Loading Ratio | Contact Time (min) | Result |
|---|---|---|---|
| Formula 1 with 100% pulp with high localized texture | 3.75:1 | 4:45 | Pass |
| Formula 1 with 100% pulp with high localized texture | 3.75:1 | 9:45 | Pass |
| Formula 2 with 100% pulp with high localized texture | 3.75:1 | 4:45 | Potential to Pass |
| Formula 2 with 100% pulp with high localized texture | 3.75:1 | 9:45 | Pass |

Testing was conducted against *Staphylococcus aureus* according to ATCC [6538], using 10 carrier wipes for each test. In each "Pass" result, no growth of the *Staphylococcus aureus* target organism was detected (0/10 plates). Growth was detected in 2 out of 10 plates at the 4:45 min contact time for Formula 2, indicating that upon retesting, there is the potential for a passing result. A "Pass" is achieved so long as there is no more than 1 failure (growth) out of 10 assays. The results are sufficient to support a disinfection claim (e.g., a log 6 reduction) against *Staphylococcus aureus* for about 5 and about 10 minute contact times.

In addition to testing a loading ratio of 3.75:1 at 5 and 10 minute contact times, loading ratios of 2, 2.5 and 3 were also tested, using the same 100% pulp high texture substrates as described above in conjunction with Table 7. In a similar manner as described above, 10 carrier wipes were each tested against *Staphylococcus aureus* under ATCC [6538]. All examples passed, supporting a sanitization claim against *Staphylococcus aureus* at a 5 minute contact time. In all such microefficacy testing procedures, the tested 100% pulp substrates were each 11 inches by 10.25 inches. The substrates were each individually folded in half along the 11 inch side, and stacked on each other (alternate the folded edge), and then loaded with the cleaning composition. The resulting stacks of 10 folded substrates were folded in half again to result in a substantially square geometry (5.5×5.125 inches). The neutralizer employed in such testing was Letheen broth, with 0.28% lecithin and 2% tween 80. Exposure temperature was 21° C. Soil load was 5% fetal bovine serum. The wiping procedure for each wipe was over and back two times (4 single passes total). Unmatted petri dishes were used in testing.

At a loading ratio of 2:1, all 10 wipes were dry at the end of the 4:45 exposure period. At a loading ratio of 2.5:1, four of the 10 wipes were dry at the end of the 4:45 exposure period. At a loading ratio of 3:1, one wipe was dry, and another wipe was only partially wet after the exposure period. All samples, at loading ratios of 2:1, 2:5:1, and 3:1 passed the 4:45 sanitization test (i.e., at least a 3-log reduction in *Staphylococcus aureus*). The controls for each test had *Staphylococcus aureus* populations of 6.06 average $Log_{10}$, 6.03 average $Log_{10}$, and 6.04 average $Log_{10}$ for LRs of 2:1, 2.5:1, and 3:1, respectively.

TABLE 8

| Sample | Loading Ratio | Contact Time (seconds) | *Staphylococcus aureus* [ATCC 6538] | *Klebsiella pneumoniae* [ATCC 4352] |
|---|---|---|---|---|
| Formula 3 with 1 Ply low texture substrate | 3:1 | 10 seconds | Fail | Pass |
| Formula 3 with 2 Ply low texture substrate | 3:1 | 10 seconds | Pass | Pass |
| Formula 3 with 1 Ply low texture substrate | 3:1 | 30 seconds | Pass | Pass |

Testing was conducted against *Staphylococcus aureus* according to ATCC and *Klebsiella pneumoniae* according to ATCC 4352, using 5 carrier wipes for each test. In each "Pass" result, greater than 99.9% of *Staphylococcus aureus* target organism was killed on all five carriers. Similarly, for each "Pass" result, greater than 99.9% of *Klebsiella pneumoniae* target organism was killed on all five carriers. The single ply low textured substrate with formula 3 was a "fail" because less than 99.9% of target organism *Staphylococcus aureus* were killed at 10 seconds contact time. This indicated that a two ply material at the 10 second contact time is superior for sanitization with respect to having at least a log 3 reduction in *Staphylococcus aureus*. A "Pass" is achieved so long as there is no more than 1 failure (growth) out of 10 assays. The results are sufficient to support a disinfection claim (e.g., a log 6 reduction) against *Staphylococcus aureus* for 10 second for a two ply substrate and 30 second contact times for either the single ply or two ply substrates. The single ply substrate is a commercially available paper tissue with a basis weight of about 30 gsm that comprises a blend of hardwood and softwood fibers. The two ply substrate is a commercially available paper tissue with a basis weight of about 42 gsm for the substrate only and about 48 gsm for the substrate plys and adhesive together. The two ply substrate comprises a blend of hardwood and softwood fibers where the two plys are held together with a water insoluble, polymeric glue formulation.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:
1. A pre-loaded disinfecting wipe comprising:
   (a) a substrate comprising one or more plies of the same material, where each ply has greater than 70% by weight of pulp fibers;

(b) a cleaning composition that is pre-loaded into the substrate of the wipe during manufacture, the cleaning composition comprising:
  (i) about 0.1-2% by weight of a $C_{12}$ to $C_{18}$ quaternary ammonium compound selected from the group consisting of: halides of alkyldimethylbenzyl ammonium, alkyldimethylethylbenzyl ammonium, alkyldimethylammonium and any mixtures or combinations thereof;
  (ii) about 0.5-3% by weight of a glycol ether selected from the group consisting of: diethylene glycol monoethyl ether, diethylene glycol monopropyl ether, diethylene glycol monobutyl ether, dipropylene glycol methyl ether or dipropylene glycol propyl ether and any combinations thereof; and
  (iii) about 90-99% water;
(c) wherein the substrate includes a localized texture, the substrate having a pore size distribution wherein less than 60% of a total percentage of pores of the substrate fall within a pore size range of 0 to 200 μm, the substrate having a dry density of less than 0.1 g/cm³ and wherein the disinfecting wipes release said $C_{12}$ to $C_{18}$ quaternary ammonium compound to a target surface and exhibit at least a 6-log reduction in *Staphylococcus aureus* population within 10 minutes.

2. The wipe of claim 1, wherein the disinfecting wipe does not contain any post-added cationic biocide release agent.

3. The wipe of claim 1, wherein the substrate includes a pore size distribution in which more than 30% of the total percentage of pores of the substrate fall within a pore size range of 300 μm to 400 μm.

4. The wipe of claim 1, wherein the substrate includes a pore size distribution in which a majority of the pores have a size greater than 200 μm.

5. The wipe of claim 1, wherein the substrate includes a pore size distribution including pores having a size of less than 200 μm, and at least 70% of the total of the total percentage of pores for the substrate have a pore size greater than 200 μm.

6. The wipe of claim 5, wherein the pore size distribution includes greater than 50% of pores having a pore size between 300-400 μm and less than 50% of pores have a pore size of less than 200 μm.

7. The wipe of claim 6, wherein the pore size distribution includes greater than 55% of pores having a pore size between 300-400 μm and less than 40% of pores having a size of less than 200 μm.

8. The wipe of claim 1, wherein the substrate has a density from 0.05 g/cm³ to less than 0.1 g/cm³.

9. The wipe of claim 1, wherein the substrate has a density from 0.05 g/cm³ to 0.08 g/cm³.

10. The wipe of claim 1, wherein the substrate has a pore density where the number of pores is greater than 200,000 per in² and less than 300,000 per in².

11. The wipe of claim 1, wherein the substrate has a pore density where the number of pores is from 225,000 per in² to 275,000 per in².

12. The wipe of claim 1, wherein the disinfecting wipe releases said $C_{12}$ to $C_{18}$ quaternary ammonium compound to a target surface and exhibit at least a 6-log reduction in *Staphylococcus aureus* population within about 5 minutes.

13. The wipe of claim 1, wherein the substrate comprising two or more plies of the same material.

* * * * *